United States Patent
Maheshwari et al.

(10) Patent No.: US 11,416,684 B2
(45) Date of Patent: Aug. 16, 2022

(54) AUTOMATED IDENTIFICATION OF CONCEPT LABELS FOR A SET OF DOCUMENTS

(71) Applicant: Adobe Inc., San Jose, CA (US)

(72) Inventors: Paridhi Maheshwari, Karnataka (IN); Harsh Deshpande, Mumbai Maharashtra (IN); Diviya Singh, Uttar Pradesh (IN); Natwar Modani, Karnataka (IN); Srinivas Saurab Sirpurkar, Andhra Pradesh (IN)

(73) Assignee: Adobe Inc., San Jose, CA (US)

( * ) Notice: Subject to any disclaimer, the term of this patent is extended or adjusted under 35 U.S.C. 154(b) by 213 days.

(21) Appl. No.: 16/784,145

(22) Filed: Feb. 6, 2020

(65) Prior Publication Data
US 2021/0248323 A1   Aug. 12, 2021

(51) Int. Cl.
*G06F 40/137* (2020.01)
*G06F 40/237* (2020.01)
*G06F 40/279* (2020.01)
*G06F 40/30* (2020.01)
(Continued)

(52) U.S. Cl.
CPC ............ *G06F 40/30* (2020.01); *G06F 40/216* (2020.01); *G06V 30/416* (2022.01)

(58) Field of Classification Search
CPC .... G06F 40/137; G06F 40/205; G06F 40/237; G06F 40/242; G06F 40/279; G06F 40/30
USPC .......... 704/1, 9, 10; 707/736, 738, 741, 748, 707/749, 752, 753
See application file for complete search history.

(56) References Cited

U.S. PATENT DOCUMENTS

| | | | |
|---|---|---|---|
| 2003/0177000 A1* | 9/2003 | Mao | G06F 40/289 704/9 |
| 2003/0217335 A1* | 11/2003 | Chung | G06F 40/30 704/9 |
| 2007/0005592 A1* | 1/2007 | Kender | G06F 40/169 |

(Continued)

OTHER PUBLICATIONS

Wong et al., "An Information-Theoretic Measure of Term Specificity", Journal of the Association for Information Science and Technology (JASIST), vol. 43, Issue 1, Jun. 2014, pp. 54-61 1992. (Year: 1992).*

(Continued)

*Primary Examiner* — Martin Lerner
(74) *Attorney, Agent, or Firm* — Kilpatrick Townsend & Stockton LLP

(57) ABSTRACT

Techniques are described for intelligently identifying concept labels for a set of multiple documents where the identified concept labels are representative of and semantically relevant to the information contained by the set of documents. The technique includes extracting semantic units (e.g., paragraphs) from the set of documents and determining concept labels applicable to the semantic units based on relevance scores computed for the concept labels. The technique includes determining an initial set of concept labels for the set of documents based on the applicable concept labels. The technique further includes obtaining a reference hierarchy associated with the reference set of concept labels and determining a final set of concept labels for the set of documents using a reference hierarchy, the initial set of concept labels, and the relevance scores. The technique includes outputting information identifying the final set of concept labels for the set of documents.

19 Claims, 14 Drawing Sheets

(51) Int. Cl.
  *G06F 40/216* (2020.01)
  *G06V 30/416* (2022.01)

(56) References Cited

U.S. PATENT DOCUMENTS

| | | | |
|---|---|---|---|
| 2007/0233656 A1* | 10/2007 | Bunescu | G06F 40/295 |
| 2010/0185943 A1 | 7/2010 | Wang et al. | |
| 2014/0282244 A1 | 9/2014 | Speer et al. | |
| 2015/0095013 A1* | 4/2015 | Zillner | G06F 40/30 |
| | | | 704/9 |
| 2015/0278200 A1 | 10/2015 | He et al. | |
| 2015/0293905 A1* | 10/2015 | Wang | G06F 40/30 |
| | | | 704/9 |
| 2016/0012122 A1 | 1/2016 | Franceschini et al. | |
| 2016/0012336 A1* | 1/2016 | Franceschini | G06F 40/134 |
| | | | 706/55 |
| 2016/0162569 A1* | 6/2016 | Erle | G06F 40/137 |
| | | | 707/739 |
| 2017/0004202 A1 | 1/2017 | Patterson | |
| 2017/0286835 A1 | 10/2017 | Ho et al. | |
| 2018/0101773 A1 | 4/2018 | Yu | |
| 2018/0373791 A1 | 12/2018 | Yen et al. | |
| 2019/0026371 A1 | 1/2019 | Wenzek et al. | |
| 2020/0027545 A1 | 1/2020 | Xie et al. | |
| 2020/0097602 A1* | 3/2020 | Ristoski | G06F 40/295 |
| 2020/0257761 A1* | 8/2020 | Bull | G06F 40/279 |
| 2020/0286002 A1* | 9/2020 | Szanto | G06F 40/30 |
| 2021/0034822 A1 | 2/2021 | Bessho et al. | |
| 2021/0056168 A1 | 2/2021 | Bull et al. | |
| 2021/0073307 A1 | 3/2021 | Lu | |
| 2021/0157831 A1 | 5/2021 | Döring et al. | |
| 2021/0248322 A1* | 8/2021 | Modani | G06F 40/216 |
| 2021/0248323 A1 | 8/2021 | Maheshwari et al. | |

OTHER PUBLICATIONS

Jiao et al., "An entropy-based term weighting scheme and its application in e-commerce search engines", 1st International Symposium on Web Algorithms, Jun. 2015, 7 Pages. (Year: 2015).*
Gabrilovich, Evgeniy, et al., "Computing Semantic Relatedness using Wikipedia-based Explicit Semantic Analysis" IJCAI: Proceedings of the 20$^{th}$ International Joint Conference on Artificial Intelligence, Jan. 2007 6 pages.
Auer Soren, et al., "DBpedia: A Nucleus For A Web Of Open Data", In: Aberer K. et al. (eds) The Semantic Web. ISWC 2007, ASWC 2007. Lecture Notes in Computer Science, vol. 4825. Springer, Berlin, Heidelberg, 2007 14 pages.
Mikolov, Tomas, et al., "Distributed Representations of Words and Phrases and Their Compositionality", NIPS '13: Proceedings of the 26$^{th}$ International Conference on Neural Information Processing Systems—vol. 2, Dec. 2013, 9 pages.
Pennington Jeffrey, et al., "GlovVe: Global Vectors for Word Representation", https://www.google.com/url?sa=t&rct=j&q=&esrc=s&source=web&cd=&cad=rja&uact=8&ved=2ahUKEwjbtbqipt7pAhXsYt8KHdzxCEcQFjABegQIBRAB&url=https%3A%2F%2Fwww-nlp.stanford.edu%2Fpubs%2Fglove.pdf&usg=AOvVaw1K-pZZ9EuJXzLDddvrbekL, 2014, 12 pages.
Blei, David M., et al., "Latent Dirichlet Allocation", Journal of Machine Learning Research, Mar. 2003, 30 pages.
Gabrilovich, Evgeniy, et al., "Wikipedia-Based Semantic Interpretation for Natural Language Processing", Journal of Artificial Intelligence Research 34, 2009, 56 pages.
U.S. Appl. No. 16/784,000 , "Ex Parte Quayle Action", Nov. 15, 2021, 8 pages.
U.S. Appl. No. 16/784,000 , Notice of Allowance, dated Feb. 3, 2022, 9 pages.

* cited by examiner

| Words | Concept Label CL1 | Concept Label CL2 | Concept Label CL3 | ... | Text Fragment (TF) for T1 |
|---|---|---|---|---|---|
| W1 | 0.06 | 0.0 | 0.03 | | 0.02 |
| W2 | 0.05 | 0.03 | 0.0 | | 0.05 |
| W3 | 0.04 | 0.07 | 0.06 | | 0.04 |
| W4 | 0.0 | 0.05 | 0.07 | | 0.06 |
| W5 | 0.1 | 0.2 | 0.09 | | 0.07 |
| . . . | | | | | |
| Wn | 0.09 | 0.06 | 0.04 | | 0.09 |

1400

1402A-1402N

Dimensions for each concept vector, C1, C2 and C3 are {W1, W2, W3,.....Wn}

Concept Vector for C1 = {0.06, 0.05, 0.04, 0.0, 0.1,....0.09}

Concept Vector for C2 = {0.00, 0.03, 0.07, 0.05, 0.2,....0.06}

Concept Vector for C3 = {0.03, 0.0, 0.06, 0.07, 0.09,....0.04}

1404

Dimensions for Text Fragment vector are {W1, W2, W3, .....Wn}

TF Vector for T1 = {0.02, 0.05, 0.04, 0.06, 0.07,....0.09}

FIG. 14

AUTOMATED IDENTIFICATION OF CONCEPT LABELS FOR A SET OF DOCUMENTS

CROSS-REFERENCE TO RELATED APPLICATIONS

The present application is related to U.S. patent application Ser. No. 16/784,000, entitled "Automated Identification of Concept Labels for a Text Fragment" and filed concurrently with the present application, the entire contents of which are incorporated herein by reference for all purposes.

TECHNICAL FIELD

This disclosure relates generally to processing textual information. More specifically, but not by way of limitation, this disclosure describes improved and automated techniques for intelligently identifying concept labels for a set of documents, where the identified concept labels are representative of and semantically relevant to the information contained by the set of documents.

BACKGROUND

In today's information world, the ability to quickly interpret data and respond to that data is essential for the success of an organization or user. Users are bombarded with data on a regular basis and are required to comprehend the vast amounts of data in a relatively short span of time. For example, a user may have to manually sift through these vast amounts of data (e.g., multiple sections or pages of a document, multiple documents) to comprehend the information contained by the document and to identify portions of the documents that are of interest to the user. Conventional tools and techniques that attempt to assist users in understanding and interpreting volumes of data are still quite limited in their capabilities and have their pitfalls.

SUMMARY

This disclosure relates generally to processing textual information. More specifically, but not by way of limitation, this disclosure describes improved and automated techniques for intelligently identifying concept labels for a set of documents, where the identified concept labels are representative of and semantically relevant to the information contained by the set of documents.

In certain embodiments, a document labeling system is disclosed. In a first stage of processing, the document labeling system extracts a set of semantic units from a set of documents. For each semantic unit in the set of semantic units, the document labeling system determines one or more concept labels applicable to the semantic unit from a reference set of concept labels. In some examples, the concept labels are determined based on relevance scores computed for the reference set of concept labels. In some examples, the relevance score for a concept label in the reference set of concept labels is indicative of a degree of relevance of the concept label to contents of the semantic unit.

In certain examples, the reference set of concept labels include titles of a set of reference articles and the set of reference documents include Wikipedia articles. In certain examples, the set of semantic units include a set of paragraphs in the set of documents. In certain examples, the concept labels applicable to the semantic unit are determined by computing, for each concept label in the reference set of concept labels, the relevance score for the concept label for the semantic unit. Based on the relevance scores computed for the concept labels in the reference set of concept labels for the semantic unit, the concept labels applicable to the semantic unit from the reference set of concept labels are selected.

In a second stage of processing, the document labeling system determines an initial set of concept labels for the set of documents based on the concept labels determined for the set of semantic units. In certain examples, determining the initial set of concept labels for the set of documents includes for each semantic unit in the set of semantic units, computing an entropy value for the semantic unit based on the concept labels determined to be applicable to the semantic unit and the relevance scores computed for those concept labels for the semantic unit. In certain examples, the entropy value for the semantic unit indicates a degree of specificity of the concept label to the semantic unit. In certain embodiments, determining the initial set of concept labels further includes ordering the semantic units based on the entropy values computed for the semantic units to generate an ordered list of semantic units. The processing further includes using the ordered list of semantic units to determine the initial set of concept labels for the set of documents. In certain examples, a semantic unit in the set of semantic units with a higher computed entropy value is placed lower in the ordered list of semantic units than a semantic unit having a lower computed entropy value.

In certain embodiments, determining the initial set of concept labels for the set of documents further comprises (a) selecting an unprocessed semantic unit in the ordered list of semantic units with the lowest entropy value. The processing further includes (b) adding to the initial set of concept labels, any concept label associated with the semantic unit that is not already in the initial set of concept labels and (c) marking the selected semantic unit as processed. In certain examples, the processing further includes repeating (a), (b), and (c) until all the semantic units in the ordered list of semantic units have been processed or until a first threshold criterion is satisfied. In certain examples, the first threshold criterion is satisfied when a pre-configured threshold number of concept labels are included in the initial set of concept labels. In certain examples, the processing further includes determining that the first threshold criterion is satisfied and adding additional one or more concept labels to the initial set of concept labels to ensure that each semantic unit is associated with at least one concept label in the initial set of concept labels. In certain examples, adding the additional one or more concept labels to the initial set of concept labels includes for at least one unprocessed semantic unit in the ordered list of semantic units, identifying that a first concept label associated with the unprocessed semantic unit is not included in the initial set of concept labels and adding the first concept label to the initial set of concept labels.

In a third stage of processing, the document labeling system obtains a reference hierarchy associated with the reference set of concept labels. In certain examples, the reference hierarchy identifies hierarchical relationships between two or more concept labels in the reference set of concept labels. The document labeling system then determines a final set of concept labels for the set of documents using the reference hierarchy, the initial set of concept labels, and the relevance scores. In certain embodiments, determining the final set of concept labels comprises identifying, based upon the reference hierarchy, hierarchical relationships between concept labels in the initial set of concept labels and generating a Directed Acyclic Graph (DAG) for representing the hierarchical relationships. In certain examples, each node in the DAG represents a concept label in the initial set of concept labels where connections between the nodes in the DAG represent the hierarchical relationships. The processing further includes identifying, based upon the reference hierarchy, a set of ancestor concept labels for the concept labels in the initial set of concept labels, where, for at least a first concept label in the initial set of concept labels, the set of ancestor concept labels comprise multiple concept labels that are ancestors of the first concept label in the reference hierarchy. In certain examples, the multiple concept labels are not in the initial set of concept labels. In certain examples, the processing includes updating the DAG to add nodes corresponding to the set of ancestor concept labels to the DAG, where the updating includes adding connections to the DAG of nodes to represent hierarchical relationships between the nodes representing the set of ancestor concept labels and the nodes representing the concept labels in the initial set of concept labels.

In certain embodiments, determining the final set of concept labels further includes assigning a weight to each node in the DAG based on the relevance scores associated with the concept labels represented by the DAG. The processing further includes computing a usefulness score for each node in the DAG of nodes based on the weight of the node. In certain examples, the usefulness score for each node in the DAG of nodes is computed based on a weighted relevance score computed for the node and a weighted relevance score computed for one or more descendant nodes of the node in the DAG of nodes. The processing further includes selecting a node from the DAG of nodes with the highest usefulness score and adding a concept label represented by the node selected from the DAG of nodes to the final set of concept labels.

In certain embodiments, the processing further includes (a) removing the selected node from the DAG of nodes to generate an updated DAG of nodes, (b) re-computing a weight for each node remaining in the updated DAG of nodes, (c) re-computing a usefulness score for each node in the updated DAG of nodes, (d) selecting a node from the updated DAG of nodes with the highest usefulness score and (e) adding a concept label represented by the node selected from the updated DAG of nodes to the final set of concept labels. In certain examples, the processing further includes repeating (a), (b), (c), (d), and (e) until a number of concept labels included in the final set of concept label equals or is higher than a pre-configured threshold number of concept labels.

In certain examples, the final set of concept labels for the set of documents comprises a concept label that is included in the reference set of concept labels and not included in the initial set of concept labels.

In certain embodiments, the document labeling system outputs information associated with the final set of concept labels for the set of document. The information includes, for at least one concept label in the final set of concept labels, outputting a usefulness score associated with the concept label. In certain examples, the usefulness score is indicative of the overall relevance of the concept label in the final set of concept labels for representing the contents of the set of documents. In certain embodiments, document labeling system performs processing to receive information identifying selection of a particular concept label from the final set of concept labels and responsive to the received information, outputs information identifying all documents from the set of documents that include at least one semantic unit for which the particular concept label is identified as being applicable. In certain examples, document labeling system performs processing to output information identifying all semantic units from one or more semantic units for which the particular concept label is identified as being applicable. In certain examples, the document labeling system performs processing to receive information identifying selection of a particular document from the set of documents and responsive to the received information, outputs information identifying all concept labels in the final set of concept labels as being applicable to the particular document.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 14 illustrates an example of concept representation vectors generated for a reference set of concept labels and a text fragment vector generated for a text fragment, according to some embodiments.

DETAILED DESCRIPTION

Figure 1:
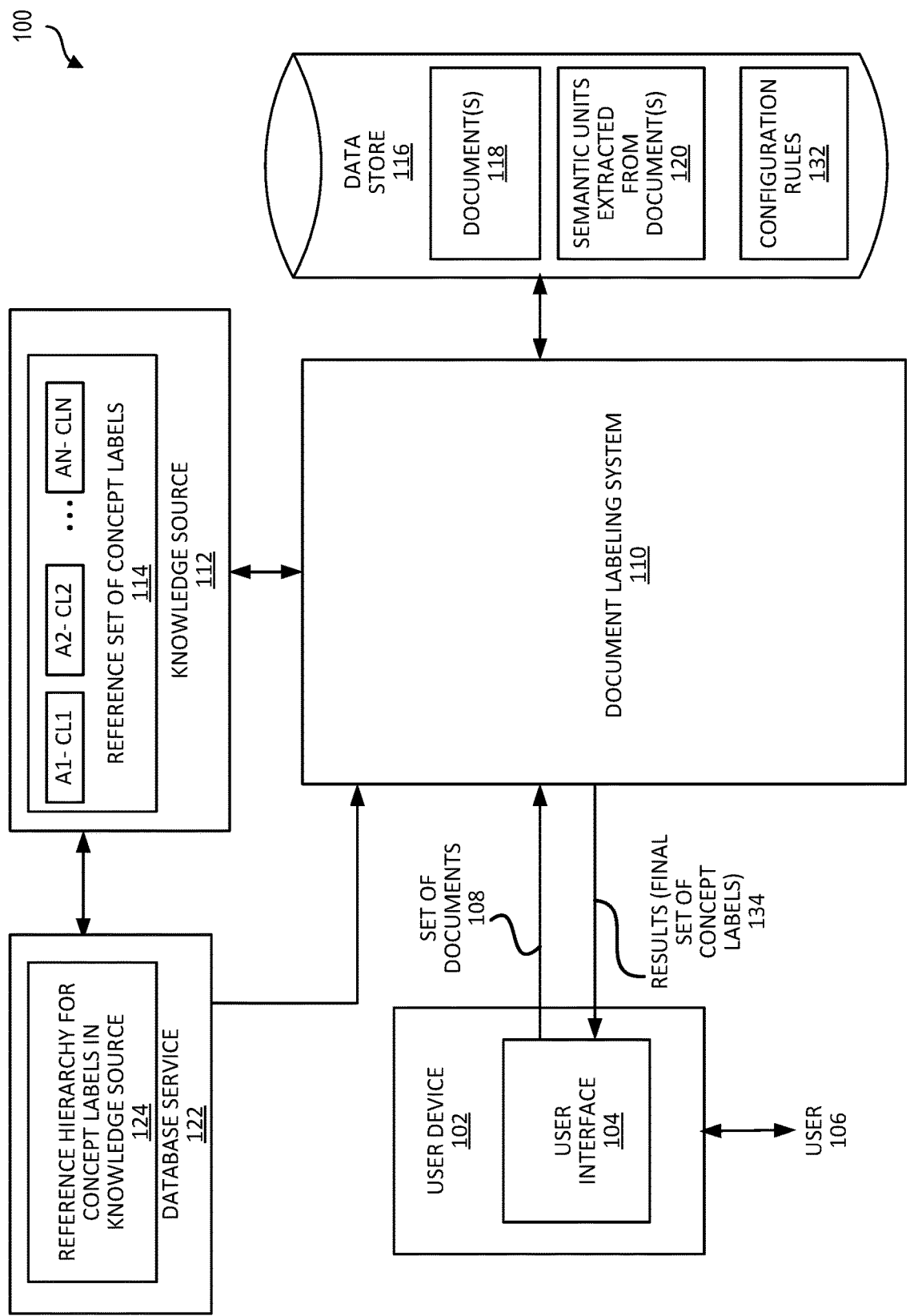
FIG. 1 depicts an example computing environment including a document labeling system 110 that is configured to process a set of documents as disclosed herein according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes improved and automated techniques for intelligently identifying concept labels for a set of documents, where the identified concept labels are representative of and semantically relevant to the information contained by the set of documents. The concept labels identified for the set of documents provide a quick and convenient mechanism to convey information regarding the contents of the set of documents to a user thus enabling the user to more quickly process the documents.

As indicated in the Background section, conventional tools and techniques that attempt to assist users in understanding and interpreting volumes of data (e.g., multiple documents) are still quite limited in their capabilities and have their pitfalls. For example, some conventional techniques (e.g., text mining, word cloud tools) organize or summarize documents based upon the frequency of recurring patterns (e.g., words) in the documents. The output of these tools is however limited to words that actually occur in the document being analyzed, and many times this does not provide a meaningful, lucid, and interpretable representation of the information contained by the document. Some other tools attempt to perform topic detection for documents, but the analysis is restricted to a small set of predefined topics using pre-defined templates. These tools also assume that the topics are independent of each other and their results many times include redundant topics for a document. Further, some of these techniques are restricted to performing the analysis at the document-level and cannot be used for analyzing text fragments within a set of documents. Some existing tools attempt to apply supervised machine learning techniques for analyzing documents. However, there may not be sufficient ground truth training data available and given the large number of potential concept labels, this cannot be performed as a classification task. Accordingly, existing techniques do not adequately solve the problem of identifying meaningful and relevant concept labels for a set of documents.

The various embodiments described in the present disclosure address the deficiencies of conventional techniques described above. A document labeling system is disclosed that identifies, based upon information contained in a set of documents, one or more concept labels that are representative of and semantically relevant to the information contained in the set of documents. The document labeling system performs processing to ensure that the concept labels identified for a set of documents effectively (and better than conventional techniques) represent information regarding the contents of the set of documents to a user. For example, the document labeling system performs processing at the granularity of semantic units within documents to gain a better understanding of the contents of the documents. The document labeling system also performs processing to ensure that an appropriate number of concept labels are identified for a set of documents such that the number does not overwhelm the user. Additionally, the concept labels that are selected by the document labeling system for the set of documents are such that they properly convey information regarding the contents of the set of documents to the user and this includes performing processing to reduce semantic overlap between multiple concept labels selected for a set of documents.

In certain embodiments, the processing performed by the document labeling system comprises multiple stages. In a first stage, the document labeling system obtains a set of documents to be analyzed and extracts semantic units from the set of documents. As described herein, the term "semantic unit" refers to a fragment of text within the document. A text fragment may represent a sequence of multiple words, multiple lines, a paragraph, one or more contiguous portions of a paragraph, multiple paragraphs, or other contiguous portions within the document. For illustrative purposes in this disclosure, a semantic unit in a document represents a paragraph in the document. Various examples has been described in this disclosure where semantic units correspond to paragraphs within a document. This is however not intended to be limiting.

For each extracted semantic unit, the document labeling system then identifies one or more concept labels that are relevant or applicable to the semantic unit. The concept labels identified for the semantic units are selected from a reference set of concept labels, which may be stored in a knowledge base accessible to the document labeling system. In certain embodiments, the knowledge base comprises a corpus of multiple reference documents and the titles of the reference documents correspond to the concept labels in the reference set of concept labels. In a particular implementation, the corpus of reference documents comprise Wikipedia articles/documents and the titles of the Wikipedia articles represent the reference set of concept labels. As part of processing performed in the first stage, for each extracted semantic unit, relevance or similarity scores are computed for each concept label in the reference set of concept labels and the semantic unit. Based upon the computed scores, one or more concept labels applicable to each extracted semantic unit are determined.

In a second stage of processing, the document labeling system determines an initial set of concept labels for the set of documents from the concept labels identified in the first stage for the extracted semantic units. In certain embodiments, the initial set of concept labels are determined based on determining an entropy value for each semantic unit and ordering the semantic units in ascending order of their entropy values (e.g., a semantic unit with a higher entropy value is placed lower in the ordered list and a semantic unit with a lower entropy value is placed higher in the ordered list). As described herein, the term "entropy value" for a semantic unit (e.g., a paragraph) indicates a degree of specificity to the semantic unit of one or more concept labels identified for the semantic unit. In certain examples, the entropy value refers to a measure of certainty with which concept labels identified as being applicable to a semantic unit are capable of representing content contained in the semantic unit. A low entropy value for a semantic unit (e.g., a paragraph) in a document implies greater specificity or applicability of the concept labels identified as applicable (i.e., relevant) to the semantic unit. Thus, ordering the semantic units in ascending order based upon their associated entropy values and processing the semantic units with lower associated entropy values before semantic units with higher associated entropy values ensures that semantic units with identified concept labels that are most representative of and semantically relevant to the contents of the semantic units are given more importance and selected for processing before semantic units with a higher associated entropy value. Using the ordered list of semantic units, the document labeling system selects concept labels to be included in the initial set of concept labels for the set of documents from the concept labels associated with the extracted semantic units. In certain embodiments, based on the ordered list of semantic units, and as part of the second stage of processing, document labeling system selects concept labels to be added to the initial set of concept labels by selecting a semantic unit with the lowest entropy value, identifying concept labels applicable to the selected semantic unit amongst already used concept labels, adding to the initial set of concept labels, any concept label associated with the semantic unit that is not already in the initial set of concept labels and repeating this process until a certain number of concept labels are included in the initial set. The initial set of concept labels include concept labels that are representative of and semantically relevant to the information represented by the set of documents.

In a third stage of processing, document labeling system determines a final set of concept labels for the set of documents from the initial set of concept labels determined in the second stage. To facilitate this processing, the document labeling system uses a reference hierarchy, the initial set of concept labels identified in the second stage, and relevance scores computed for the concept labels during the first stage of processing. As a result of the third stage of processing, the number of concept labels for the set of documents is further reduced. As part of the third stage of processing, the document labeling system obtains a reference hierarchy for the reference set of concept labels. The reference hierarchy identifies hierarchical relationships between the concept labels in the reference set of concept labels. In some implementations the reference hierarchy is a directed acyclic graph (DAG) comprising nodes representing concept labels and directed edges between nodes representing hierarchical (e.g., parent-child) relationships between the concept labels. The document labeling system uses the reference hierarchy to identify hierarchical relationships between the concept labels in the initial set of concept labels. In certain examples, the hierarchical relationships identify the relatedness of the concept labels selected in the initial set of concept labels as well as the relatedness of these concept labels to their parent/ancestor concept labels using the reference hierarchy. For instance, for each concept label in the initial set of concept labels, the document labeling system, identifies, based upon the reference hierarchy, a set of ancestor concept labels for the concept label. For example, for a first concept label in the initial set of concept labels, the set of ancestor concept labels identified by the document labeling system from the reference hierarchy comprises multiple concept labels that are ancestors of the first concept label in the reference hierarchy. The number of levels of ancestors that are determined for a concept label is user-defined. In one embodiment, three levels of ancestors are determined. In such an embodiment, for each concept label in the initial set of concept labels, the parent, grand-parent, and grand-grand-parent concept labels are determined using the reference hierarchy. The ancestor concept labels may include concept labels that are not in the initial set of concept labels.

In certain examples, the document labeling system generates a directed acyclic graph (DAG) comprising nodes and directed edges between the nodes The nodes in the DAG represent the concept labels in the initial set of concept labels and the ancestor concept labels. The edges between the nodes in the DAG represent hierarchical relationships between the concept labels represented by the nodes. An edge directed from a first node to a second node represents a hierarchical relationship between the concept label represented by the first node and the concept label represented by the second node, and more specifically, that the concept label represented by the first node is a parent of the concept label represented by the second node.

In certain examples, as part of the processing performed in the third stage, the document labeling system applies a pruning technique to select a certain number of nodes (and correspondingly a certain number of concept labels represented by those nodes) from the DAG. In certain examples, the nodes are selected based on computing a usefulness score for the nodes using relevance scores computed for the concept labels represented by the nodes. The usefulness score is indicative of the overall usefulness (i.e., relevance) of the concept label to represent the contents of the set of documents. From these selected nodes, a final set of concept labels for the set of documents is determined. In certain examples, the final set of concept labels can include parent/ancestor nodes (i.e., concept labels) of the concept labels selected in the initial set of concept labels. The final set of concept labels determined by the document labeling system include concept labels that are both representative of and semantically relevant to the information represented by the set of documents as well as concept labels that are specific to the content contained in the set of documents. For instance, a concept label that is relevant to a semantic unit in a document may be more specific than its parent concept label, which may in turn be more specific that its grand-parent concept label.

In certain examples, document labeling system outputs information associated with the final set of concept labels for the set of documents. The information may include information identifying concept labels in the final set of concept labels. In certain embodiments, for each concept label in the final set of concept labels, the information output to a user may include information identifying a usefulness score computed for the concept label, where the usefulness score indicates the overall usefulness (i.e., relevance) of the concept label to represent the contents of the set of documents. In certain embodiments, information may be output that enables a user to interact in various ways with the information identifying the final set of concept labels. For example, the user may, via a user interface on a user's device, select a particular concept label from the final set of concept labels output to the user, and in response, the user interface displays information identifying one or more documents from the set of document that contain at least one semantic unit having the selected particular concept label as being associated with the semantic unit. The user may then select a particular document and view semantic units within that selected document that are associated with the particular concept label. As another example, in response to the user selecting a particular concept label from the final set of concept labels, information may be output identifying all semantic units in the set of documents that have the particular selected concept label associated with them. The user may also select a particular document, and in response, information may be output identifying one or more concept labels from the final set of concept labels that are associated with semantic units in the selected document. A user may also select a particular semantic unit in a document, and in response, information may be output to the user identifying one or more concept labels from the final set of concept labels that are associated with the selected semantic unit. In this manner, a user can use the information regarding the final set of concept labels to navigate to certain documents in the set of documents and/or to certain semantic units in the set of documents that have a user-selected concept label associated with them.

The following non-limiting example is used to introduce certain embodiments. In this example, a document labeling system is executed on a computing system and assists a user with determining concept labels for a set of documents that are relevant and representative of information contained by the set of documents. The user, using a user device, may initiate a request for a set of multiple documents (e.g., D1 and D2) to be analyzed. The set of documents may be identified using document identifiers (e.g., document file names, links to the documents, etc.) and/or by selecting specific documents. The user may make the selections via a user interface or application executed by the user device. The request is then communicated to the document labeling system for processing. Upon receiving the request, in a first processing stage, the document labeling system extracts semantic units (e.g., paragraphs) from the documents to be analyzed. For example, assume that five paragraphs (SU1, SU2, SU3, SU4 and SU5) are extracted. The document labeling system then computes, for each extracted semantic unit, a relevance score for each concept label in the reference set of concept labels. Based upon these relevance scores, for each semantic unit, one or more concept labels are selected as being relevant and applicable to that semantic unit. For example, for the five paragraphs extracted from documents D1 and D2, the following may be determined based upon the computed relevance scores:

{SU1: CL1, CL3, CL5}—concept labels CL1, CL3, and CL5 are selected for SU1
{SU2: CL2, CL3, CL4}—concept labels CL2, CL3, and CL4 are selected for SU2
{SU3: CL5, CL6, CL10}—concept labels CL5, CL6, and CL10 are selected for SU3
{SU4: CL7, CL8}—concept labels CL7 and CL8 are selected for SU4, and
{SU5: CL6, CL7 and CL8}—concept labels CL6, CL7, and CL8 are selected for SU5

In a second stage of processing, the document labeling system determines an initial set of concept labels for the set of documents (i.e., for the set of documents D1 and D2) based on the concept labels for the semantic units identified in stage one. This is done by first computing entropy values for the semantic units and then ordering the semantic units in ascending order of their entropy values (e.g., a semantic unit with a higher entropy value is placed lower in the ordered list and a semantic unit with a lower entropy value is placed higher in the ordered list). For example, the document labeling system may determine the ordered list of semantic units to be: (SU3, SU1, SU2, SU4, SU5). Based on the ordered list, the document labeling system may determine an initial set of concept labels for the set of documents. For this example, let's assume this initial set is {CL1, CL2, CL3, CL4, CL5, CL6, CL7 and CL8}. It is to be noted in this example that the initial set of concept labels for the documents does not include all the concept labels selected for the semantic units. For example, CL10 is not included in the initial set of concept labels.

In a third stage, the document labeling system determines a final set of concept labels from the initial set by taking into consideration hierarchical relationships between the concept labels selected in the initial set of concept labels as well as the relatedness of these concept labels to their parent/ancestor concept labels obtained using a reference hierarchy. For the above example, the final set of concept labels determined by the document labeling system may be as follows: (CL3, CL4, CL6, PCL1-2, CL8). It is to be noted in this example that the final set of concept labels does not include all the concept labels in the initial set of concept labels for the set of documents. Additionally, the final set may include a concept label that is not in the initial set of concept labels. For example, PCL1-2 included in the final set of this example is a parent/ancestor concept label of concept labels CL1 and CL2 and was not included in the initial set of concept labels but was included in the final set as a result of processing performed in the third stage. Information related to the final set of concept labels may then be output to the requesting user. The user may use this information to navigate to certain documents in the set of documents and/or to certain semantic units in the set of documents that have a user-selected concept label associated with them.

Referring now to the drawings, FIG. 1 depicts an example computing environment 100 including a document labeling system 110 that is configured to process a set of documents as disclosed herein according to certain embodiments. Document labeling system 110 may be implemented by one or more computing systems. For example, the one or more computing systems may execute computer-readable instructions (e.g., code, program) to implement document labeling system 110. Portions of data or information used by or generated by document labeling system 110 as part of its processing may be stored in a persistent memory such as data store 116. The systems and subsystems depicted in FIG. 1 may be implemented using only software (e.g., code, instructions, program) executed by one or more processing units (e.g., processors, cores) of a computing system, hardware, or combinations thereof. The software may be stored on a non-transitory storage medium (e.g., on a memory device). Computing environment 100 depicted in FIG. 1 is merely an example and is not intended to unduly limit the scope of claimed embodiments. One of ordinary skill in the art would recognize many possible variations, alternatives, and modifications. For example, in some implementations, document labeling system 110 can be implemented using more or fewer subsystems than those shown in FIG. 1, may combine two or more subsystems, or may have a different configuration or arrangement of subsystems.

As depicted in FIG. 1, a user 106 may interact with document labeling system 110 using a user device 102 that is communicatively coupled to document labeling system 110, possibly via one or more communication networks. User device 102 may be of various types, including but not limited to, a mobile phone, a tablet, a desktop computer, and the like. User 106 may interact with document labeling system 110 using an application (e.g., a browser) executed by user device 102. For example, user 106 may use a user interface (UI) 104 (which may be a graphical user interface (GUI)) of an application executed by user device 102 to interact with document labeling system 110. For example, user 106 may, via UI 104, select or input a set of documents 108 and send a request to document labeling system 110 to determine concept labels for the set of documents. The set of documents 108 are then communicated from user device 102 to document labeling system 110 for analysis.

Upon receiving the request from user device 102, document labeling system 110 performs processing to determine a set of concept labels for the set of documents. The results 124 of the processing performed by document labeling system 104 are then communicated back to the requesting user device 102. These results 134 may include a set of concept labels determined by document labeling system 110 as being relevant to the set of documents 108, usefulness scores associated with the concept labels, and possibly other information included in the results. The results 134 along with the set of documents may be output to user 106 via UI 104. Details related to the processing performed by the various systems and subsystems in FIG. 1 for generating concept labels for a set of documents are described below with respect to the flowchart depicted in FIG. 2 and the accompanying description.

Figure 2:
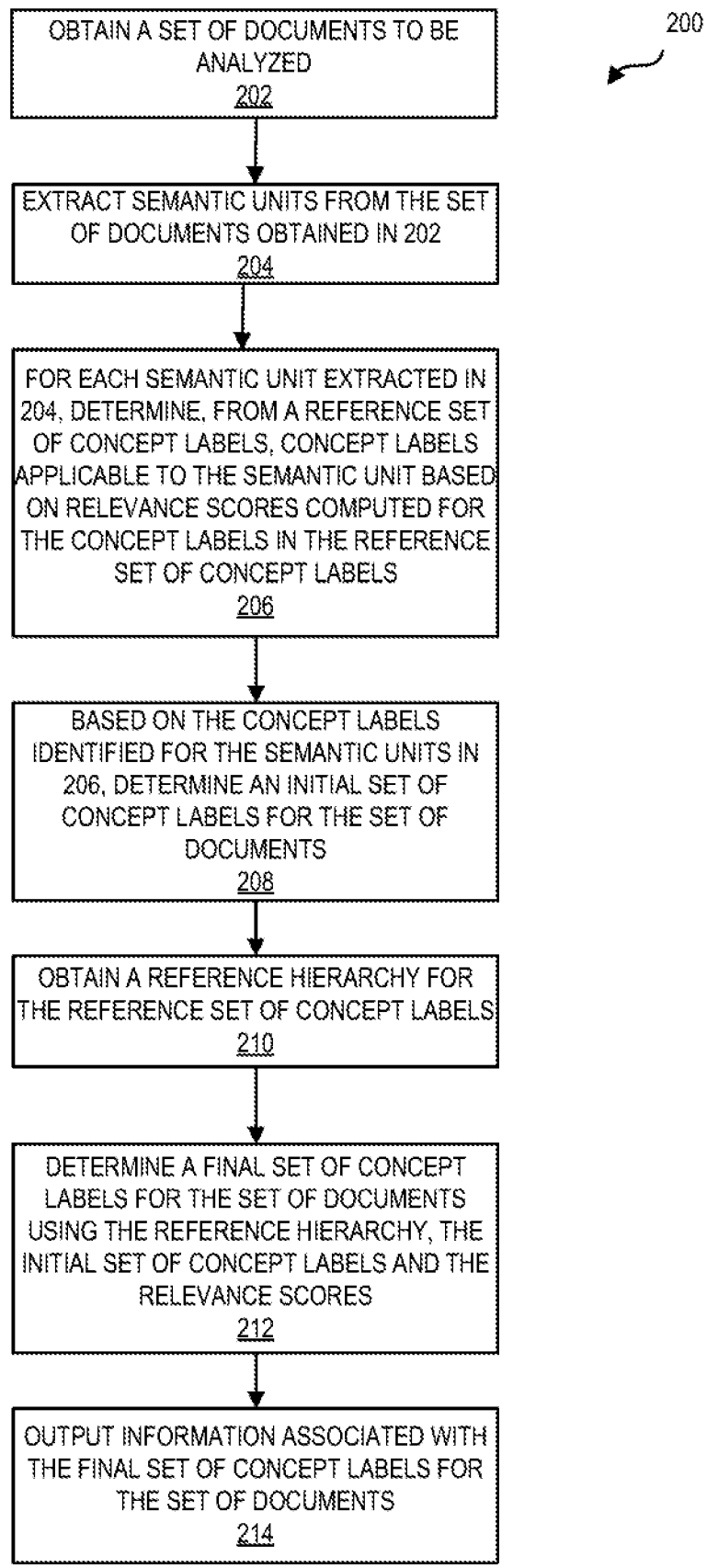
FIG. 2 depicts an example of a process for determining concept labels for a set of documents, according to certain embodiments.

FIG. 2 depicts an example of a process 200 for determining concept labels for a set of documents, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by document labeling system 110.

At block 202, a first stage of processing is initiated when a signal requesting analysis of a set of documents is received. In certain examples, document labeling system 110 obtains a signal from user 106 to analyze a set of documents. For example, in the embodiment depicted in FIG. 1, user 106 may use UI 104 to select a set of documents 108 to be analyzed and then send a request to document labeling system 110 to request concept labels to be determined for the set of documents. In certain examples, each document in the set of documents 108 may comprise one or more semantic units. In certain examples, a semantic unit may represent a fragment of text within the document. A text fragment may represent multiple words, multiple lines, a paragraph, one or more portions of a paragraph or multiple paragraphs within the document. For purposes of this disclosure, a semantic unit in a document represents a paragraph in the document.

In some instances, such as the embodiment depicted in FIG. 1, user 106 may select a set of documents to be analyzed from documents 118 loaded by document labeling system 110. For example, the user may have loaded multiple documents in document labeling system 110 for purposes of analyzing the documents. The user may then select the documents to be analyzed from these loaded documents. In certain embodiments, the user may select a set of documents and then select a "Generate Concept Labels" option (e.g., a menu item, button) via UI 104 to initiate the processing depicted in FIG. 2.

In other instances, the documents need not be loaded in order for the documents to be analyzed. For example, user 106 may, via UI 104 provide information to document labeling system 110 identifying a source location and also identifying a set of documents to be analyzed. For example, user 106 may use a file or document explorer application to select the documents to be analyzed. Document labeling system 110 can then retrieve the set of documents from the source location for analyzing the documents. The source location may be on a memory device or card, a cloud storage location, a flash drive, and the like.

At block 204, document labeling system 110 may be configured to extract semantic units from the set of documents obtained in block 202. As noted above, in certain examples, the semantic units may correspond to one or more paragraphs within a document. In some instances, document labeling system 110 may be configured to store the semantic units 120 in data store 116.

At block 206, document labeling system 110 performs a first stage of processing to determine one or more concept labels applicable to each semantic unit extracted in step 204 from a reference set of concept labels 114 stored in a knowledge source 112. In certain embodiments, the concept labels applicable to each semantic unit are determined based on computing relevance scores for the concept labels in the reference set of concept labels. Various different techniques may be used to determine, from a reference set of concept labels, one or more concept labels that are applicable for each extracted semantic unit. An example of one such technique is described in U.S. patent application Ser. No. 16/784,000, entitled "Automated Identification of Concept Labels for a Text Fragment" and filed concurrently with the present application. Certain figures and the associated description from U.S. patent application Ser. No. 16/784,000 that describe examples of techniques for determining concept labels for a semantic unit are presented below as FIGS. 11-14 and accompanying description. The techniques described in U.S. patent application Ser. No. 16/784,000 and presented below are merely meant as examples and are not intended to be limiting. Various other techniques may also be used for performing the processing in 206 in alternative embodiments.

In certain examples, reference set of concept labels 114 correspond to a set of articles stored in knowledge source 112. Each article (e.g., A1, A2, . . . An) in the set of articles comprises information identifying concept labels (e.g., CL1, CL2, . . . CLn) associated with the article based on the contents of the article. In certain embodiments, each article represents a Wikipedia article and the title of the Wikipedia article represents the concept labels for the article. Knowledge source 120 may correspond to a cloud storage location accessible to document labeling system 110 and utilized by document labeling system 110 for determining concept labels that are representative of and semantically relevant to the information contained in a set of documents (e.g., 108). Additional details related to the processing performed by document labeling system 110 for determining concept labels applicable to each semantic unit is described in FIG. 3.

At block 208, document labeling system 110 performs a second stage of processing to identify an initial set of concept labels for the set of documents based on the concept labels identified for the semantic units in block 206. Additional details related to the processing performed by document labeling system 110 to identify an initial set of concept labels for the set of documents is described in FIG. 4 and FIG. 5.

In certain embodiments, as part of a third stage of processing, document labeling system 110 determines a final set of concept labels from the initial set of concept labels identified in block 208. As part of the third stage of processing, at block 210, document labeling system 110 obtains a reference hierarchy 124 for reference set of concept labels 114 stored in knowledge source 112. In certain examples, reference hierarchy 124 may be provided by and/or managed by an external database service 122 that may be communicatively coupled to knowledge source 112 and document labeling system 110 possibly via one or more communication networks. In certain embodiments, database service 122 may generate reference hierarchy 124 by identifying hierarchical relationships between two or more concept labels in the reference set of concept labels 114 stored in knowledge source 112. Examples of database service 122 may include, for instance, open source database services such as DBpedia, Yet Another Great Ontology (YAGO), Never-Ending Language Learning (NELL) systems and the like that are capable of building an ontology using structured information present in Wikipedia articles stored in knowledge source 112.

At block 212, document labeling system 110 determines a final set of concept labels for the set of documents using the reference hierarchy, the initial set of concept labels (identified in block 208) and relevance scores computed for the concept labels. Additional details related to the processing performed by document labeling system 110 for determining a final set of concept labels for the set of documents is described in FIG. 6 and FIG. 7.

Figure 8:
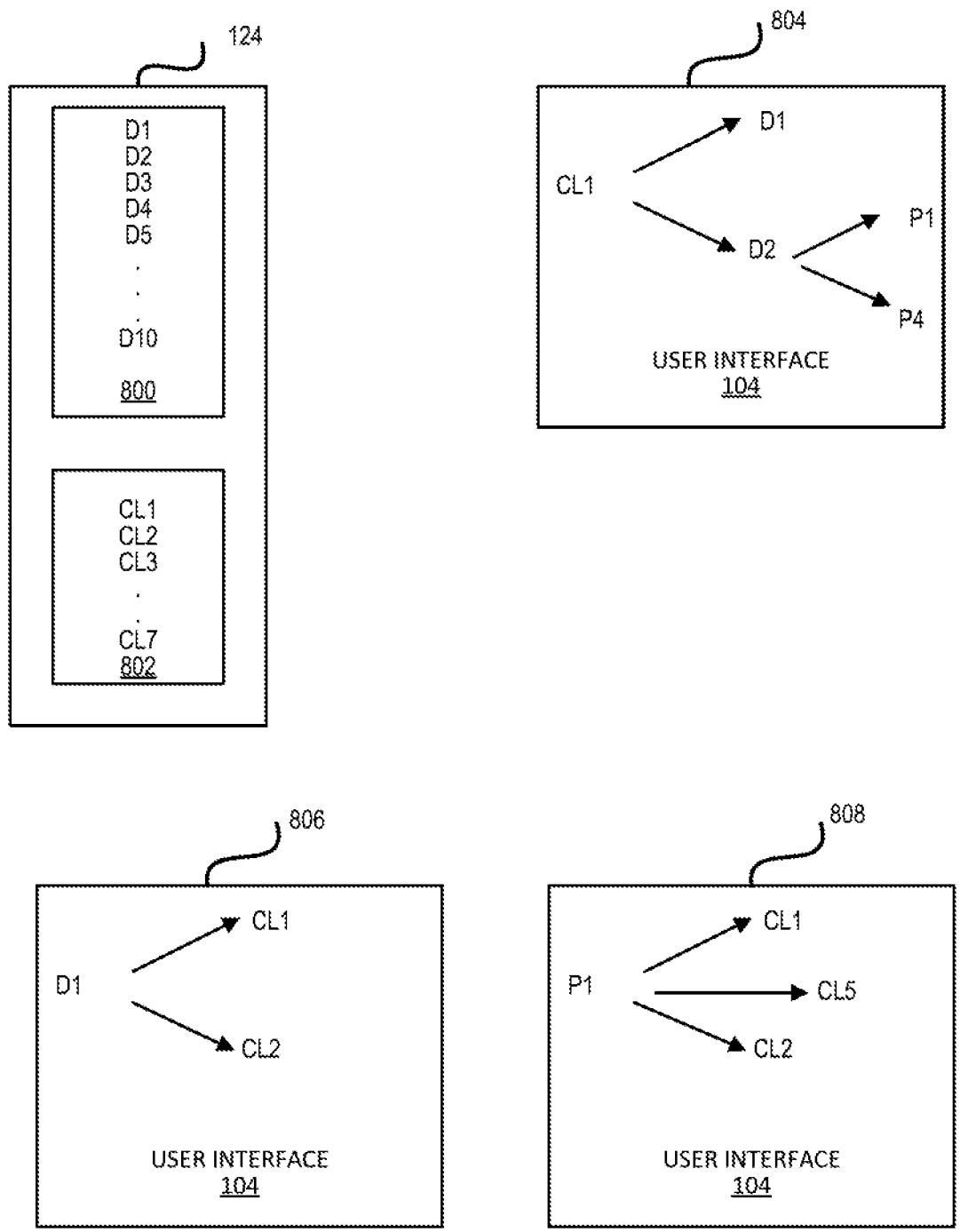
FIG. 8 depicts various types of results output by the document labeling system to a user via a user interface, according to some embodiments.

At block 214, document labeling system 110 outputs information associated with the final set of concept labels for the set of documents. The information (e.g., results 134) may include concept labels identified by document labeling system 110 as being relevant to the set of documents 108, usefulness scores associated with the concept labels, and possibly other information included in the results. Examples of the type of results 134 output by document labeling system 110 are illustrated in FIG. 8.

Figure 3:
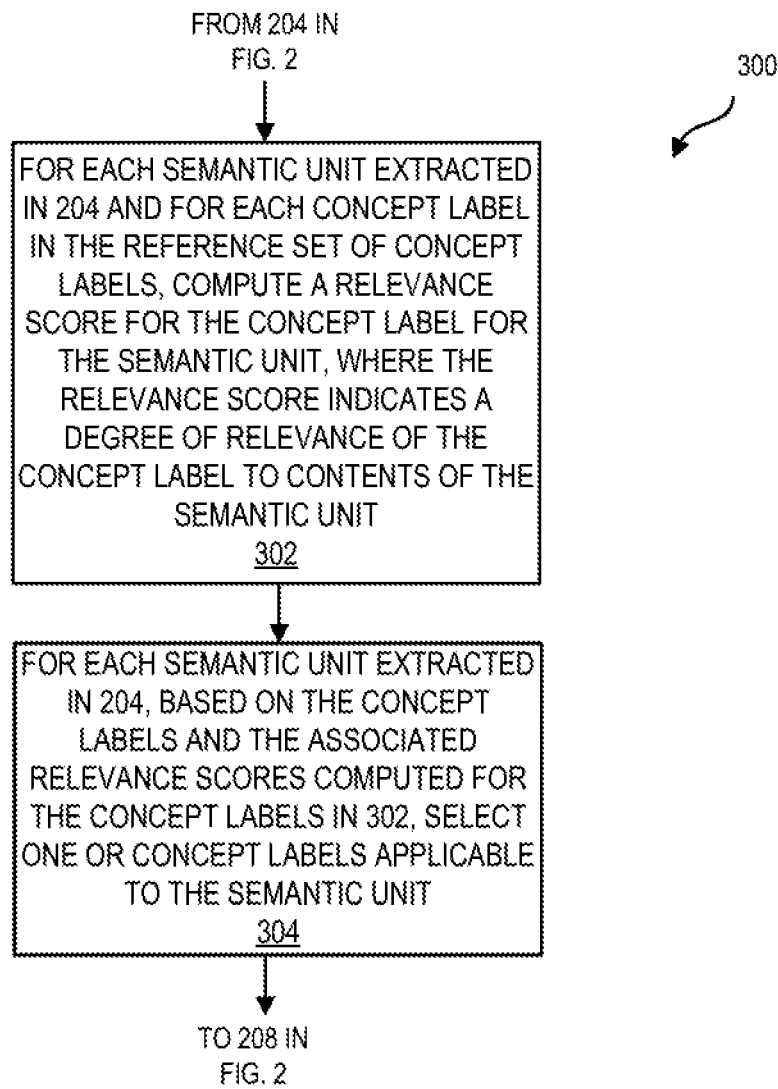
FIG. 3 depicts an example of a process for determining one or more concept labels applicable to semantic units in a set of documents, according to certain embodiments.

FIG. 3 depicts an example of a process 300 for determining one or more concept labels applicable to semantic units in a set of documents, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by document labeling system 110.

At block 302, for each semantic unit (extracted in block 204) and for each concept label in a reference set of concept labels, document labeling system 110 computes a relevance score for the concept label for the semantic unit (i.e., a semantic unit-concept label pair). In certain examples, the relevance score for a semantic unit-concept label pair is indicative of a degree of relevance of the concept label to contents of the semantic unit. Various different techniques may be used to compute relevance scores for concept labels. An example of one such technique is described in U.S. patent application Ser. No. 16/784,000, entitled "Automated Identification of Concept Labels for a Text Fragment" and filed concurrently with the present application. Certain figures and the associated description from U.S. patent application Ser. No. 16/784,000 that describe examples of techniques for computing relevance scores for concept labels are presented below as FIGS. 11-14 and accompanying description. The techniques described in U.S. patent application Ser. No. 16/784,000 and presented below are merely meant as examples and are not intended to be limiting. Various other techniques may also be used for performing the processing in 302 in alternative embodiments.

At block 304, for each semantic unit extracted in block 204, document labeling system 110 selects one or more concept labels relevant to the semantic unit based on the concept labels and the relevance scores computed for the concept labels in block 302. In certain examples, document labeling system 110 may identify/select all concept labels having non-zero relevance scores as being relevant to the sematic unit. In other examples, document labeling system 110 may select concept labels having non-zero relevance scores (or relevance scores greater than a certain threshold value) as being relevant to the semantic unit. The threshold value may be a pre-configured value (e.g., between 0-1) that is set by document labeling system 110 for processing documents. In a certain implementation, the threshold value may be stored by document labeling system 110 as part of configuration rules 132 in data store 116.

The processing then returns to block 208 of FIG. 2 to determine an initial set of concept labels for the set of documents.

Figure 4:
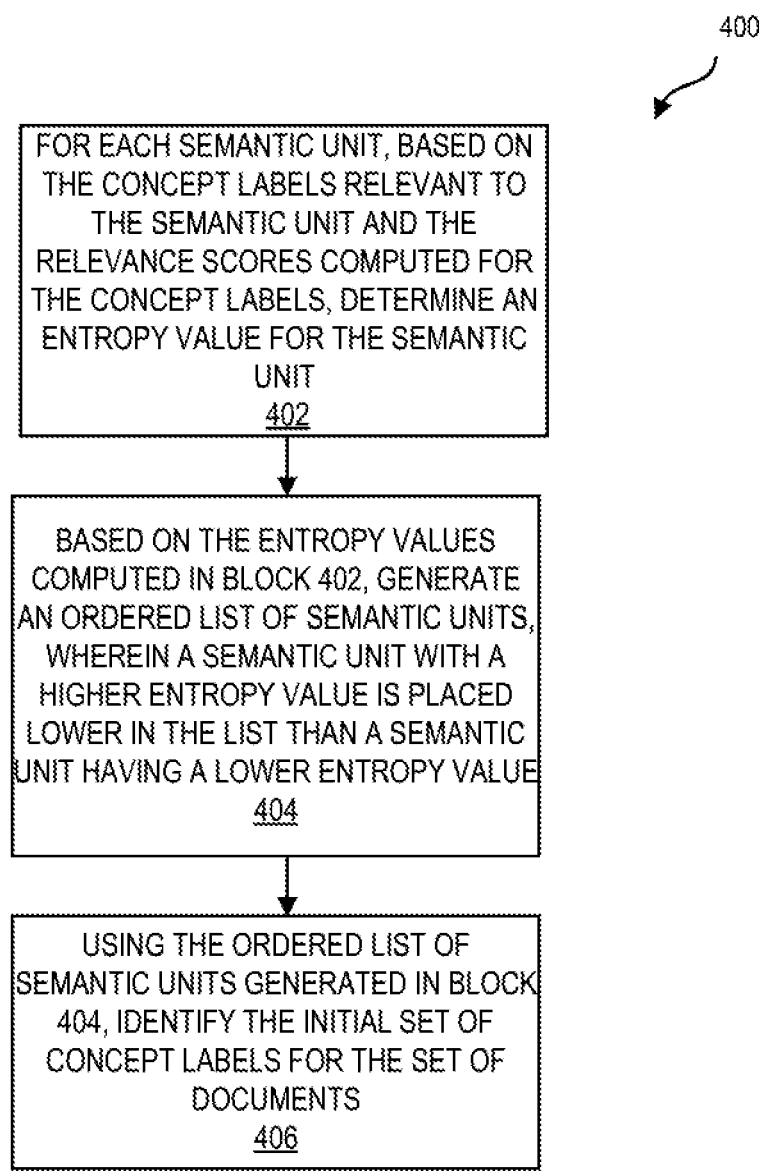
FIG. 4 depicts an example of a process for determining an initial set of concept labels for a set of documents, according to certain embodiments.

FIG. 4 depicts an example of a process 400 for determining an initial set of concept labels for a set of documents, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by document labeling system 110.

At block 402, document labeling system 110 determines an entropy value for each semantic unit. In certain embodiments, the entropy value for a semantic unit is determined based on the concept labels identified as being relevant (or applicable) to the semantic unit (e.g., determined as a result of executing block 304 of FIG. 3) and the relevance scores computed for the concept labels for the semantic unit. As used herein, the "entropy value" indicates a degree of specificity of the concept label to the semantic unit. In certain examples, the entropy value is a measure of certainty with which concept labels identified as being applicable to a semantic unit are capable of representing content in the semantic unit. Thus, a semantic unit with a low entropy value is associated with concept labels that have a strong specificity to (i.e., high certainty/high probability of being able to represent) the content in the semantic unit whereas a semantic unit with a high entropy value is associated with concept labels that have a weak specificity to (i.e., low certainty/low probability of being able to represent) the content of the semantic unit.

In certain examples, document labeling system 110 determines the entropy value for a semantic unit by translating the relevance scores computed for the concept labels applicable to the semantic unit into probability scores. The probability score for a concept label indicates the probability of relevance of the concept label to the semantic unit. In one example, the probability score for a concept label 'i' associated with a semantic unit (e.g., a paragraph P) may be computed using equation (1) reproduced below:

$$P_i = \frac{R_i}{\sum_j R_j} \qquad \text{Equation 1}$$

where the relevance score of a concept label 'i' associated with a paragraph 'P' is denoted by $R_i$ and $\sum_j R_j$ represents the sum of the relevance scores for all the concept labels associated with the paragraph 'P.'

Based on the probability scores computed for each concept label applicable to a semantic unit (i.e., a paragraph 'P'), the entropy value for a semantic unit (i.e., paragraph 'P') associated with a concept label 'i' is computed as shown in equation (2) reproduced below:

$$S = -\sum_i P_i * \log(P_i) \qquad \text{Equation 2}$$

Here, Pi is the probability as computed in Equation 1 above, and log is the natural log function. The entropy value computed in this manner indicates the amount of data needed to encode the required amount of information, and generally lower entropy is associated with greater degree of certainty.

At block 404, an ordered list of semantic units is generated based on the entropy values computed in block 402. In certain examples, the ordered list of semantic units comprise the semantic units ordered in ascending order based upon their associated entropy values (e.g., a semantic unit with a higher entropy value is placed lower in the ordered list and a semantic unit with a lower entropy value is placed higher in the ordered list). Since a low entropy value for a semantic unit (e.g., a paragraph) implies greater specificity of the concept labels applicable (i.e., relevant) to the semantic unit, ordering the semantic units in ascending order of their associated entropy values ensures that concept labels that are most representative of and semantically relevant to the information represented by the semantic units in the documents are selected for the set of documents first.

At block 406, document labeling system 110 determines the initial set of concept labels for the set of documents using the ordered list of semantic units generated in block 404. Additional details related to the processing performed by document labeling system 110 to determine the initial set of concept labels for the set of documents is described in FIG. 5 below.

Figure 5:
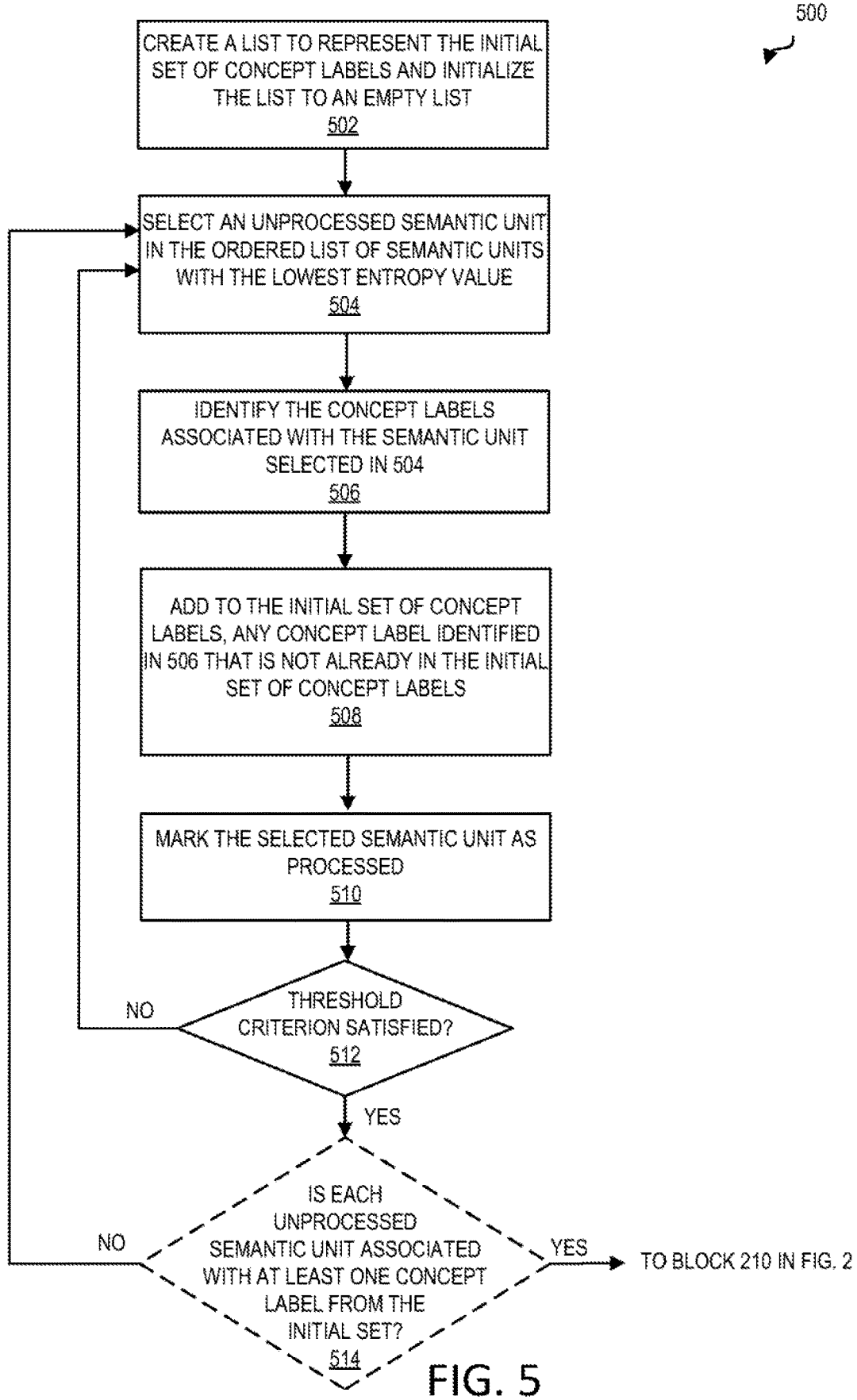
FIG. 5 depicts an example of a process for determining an initial set of concept labels for the set of documents, according to certain embodiments

FIG. 5 depicts an example of a process 500 for determining an initial set of concept labels for the set of documents, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 5, the processing depicted in FIG. 5 may be performed by document analysis system 110.

At block 502, document labeling system 110 creates a list (e.g., a linear data structure) to represent the initial set of concept labels for the set of documents and initializes the list to an empty list.

At block 504, document labeling system 110 selects an unprocessed semantic unit in the ordered list of semantic units with the lowest entropy value.

At block 506, document labeling system 110 identifies concept labels associated with the semantic unit selected in 504.

At block 508, document labeling system 110 adds, to the list representing the initial set of concept labels, any concept label associated with the semantic unit (identified in 506) that is not already in the initial set of concept labels. This ensures that the initial set of concept labels includes concept labels that are not only distinct but also representative of and semantically relevant to the information represented by the text fragment.

At block 510, document labeling system 110 marks the selected semantic unit as processed.

At block 512, document labeling system 110 performs a check to determine if a first threshold criterion has been satisfied. In certain examples, the first threshold criterion may correspond to a pre-configured threshold number of concept labels to be added to (i.e., included in) the initial set of concept labels. The first threshold criterion may be a pre-configured value (e.g., <=15 concept labels) set by document labeling system 110 for processing the set of documents. In certain examples, the first threshold criterion value may be stored by document labeling system 110 as part of configuration rules 132 in data store 116.

If at block 512, document labeling system 110 determines that the first threshold criterion is not satisfied, then the processing loops back to block 504 to select the next unprocessed semantic unit in the ordered list of semantic units with the lowest entropy value.

If the first threshold condition is satisfied, in certain examples, at block 514, document labeling system 110 may optionally perform an additional check to ensure that each (unprocessed) semantic unit in the ordered list of semantic units is associated with at least one concept label from the initial set of concept labels. If an unprocessed semantic unit is not associated with at least one concept label from the initial set of concept labels, in certain examples, the processing loops back to block 504 to select the next unprocessed semantic unit in the ordered list of semantic units with the lowest entropy value.

If, at block 512 document labeling system 110 determines that the first threshold criterion is satisfied or, at block 514 document labeling system 110 determines that each unprocessed semantic unit is associated with at least one concept label from the initial set of concept labels, then, the processing returns to block 210 of FIG. 2 to perform additional processing on the initial set of concept labels to determine a final set of concept labels for the set of documents.

Figure 6:
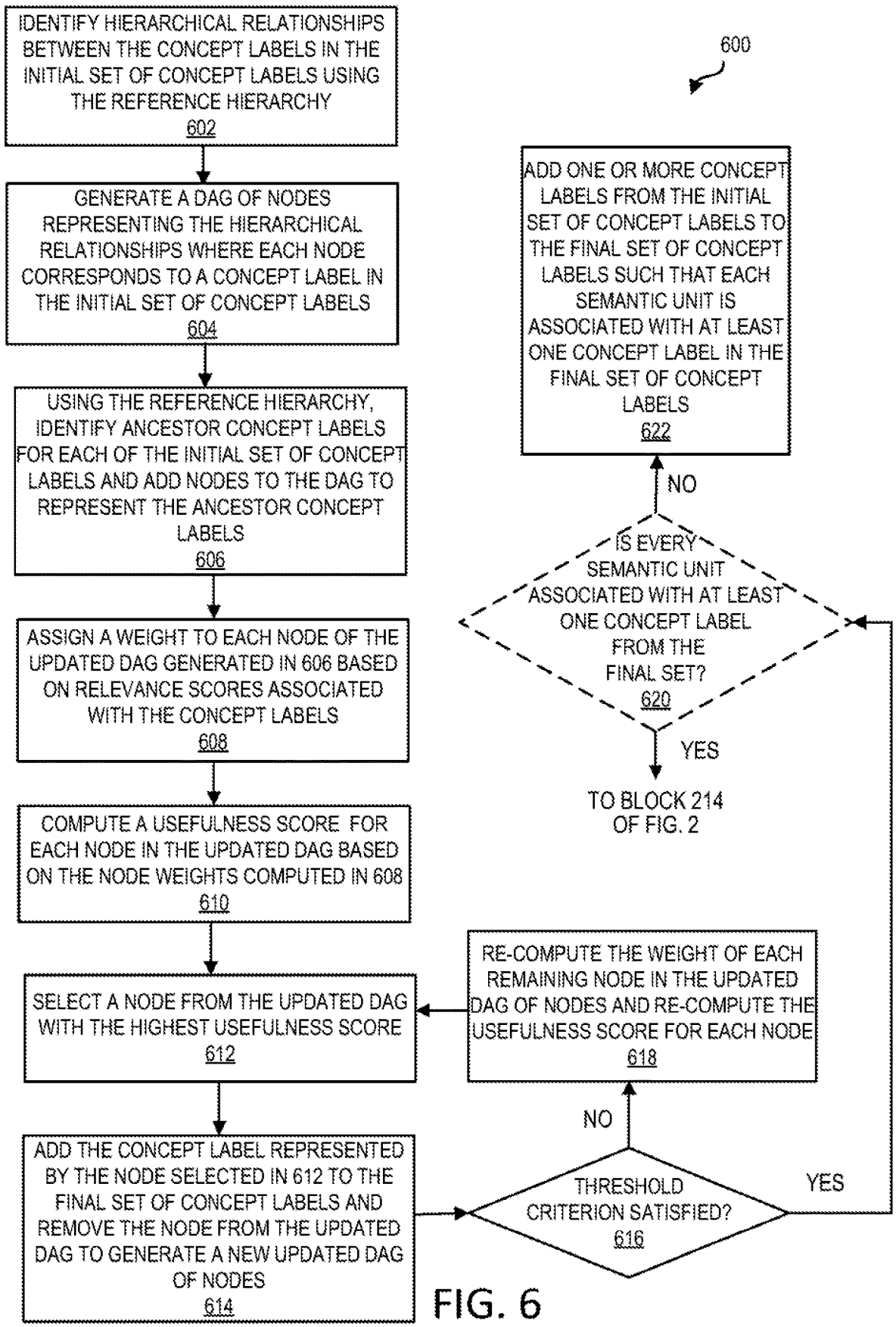
FIG. 6 depicts an example of a process for determining a final set of concept labels for the set of documents, according to certain embodiments.

FIG. 6 depicts an example of a process 600 for determining a final set of concept labels for the set of documents, according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 6, the processing depicted in FIG. 6 may be performed by document labeling system 110 upon obtaining a reference hierarchy 124 for the reference set of concept labels (e.g., as a result of executing block 210 of FIG. 2).

At block 602, document labeling system 110 identifies hierarchical relationships between the concept labels in the initial set of concept labels using the reference hierarchy 124 obtained in block 210.

Figure 7A:
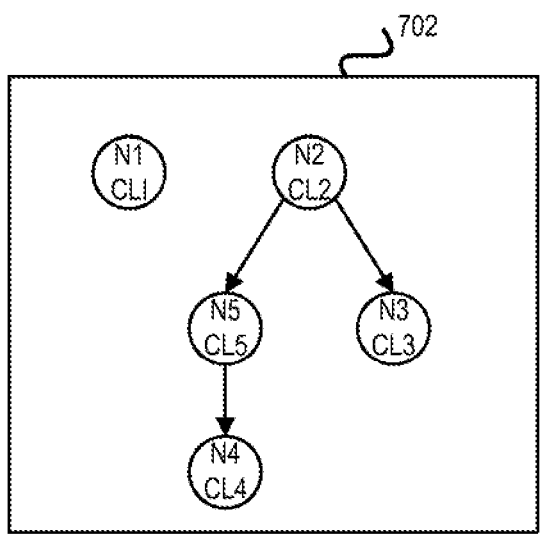
FIG. 7A illustrates an example of a Directed Acyclic Graph (DAG) of nodes generated by document labeling system, according to some embodiments.

At block 604, document labeling system 110 generates a tree of nodes representing the hierarchical relationships where each node of the tree corresponds to a concept label in the initial set of concept labels. In certain examples, the tree of nodes is represented by a Directed Acyclic graph (DAG) of nodes where each node in the DAG of nodes represents a concept label in the initial set of concept labels and, where connections (edges) between the nodes in the DAG represent the hierarchical relationships. FIG. 7A illustrates an example of a DAG generated by document labeling system, according to some embodiments. In the illustrated example, the DAG 702 represents hierarchical relationships between concept labels in the initial set of concept labels, where each node, N1, N2, N3, N4, and N5 in the tree of nodes corresponds to a concept label in the initial set of concept labels, CL1, CL2, CL3, CL4, and CL5. DAG 702 illustrated in FIG. 7A is just one example of a hierarchical tree structure generated by document labeling system 110. In other examples, document labeling system 110 may generate a different DAG 702 that include a different number of nodes representing different hierarchical relationships between the concept labels.

Figure 7B:
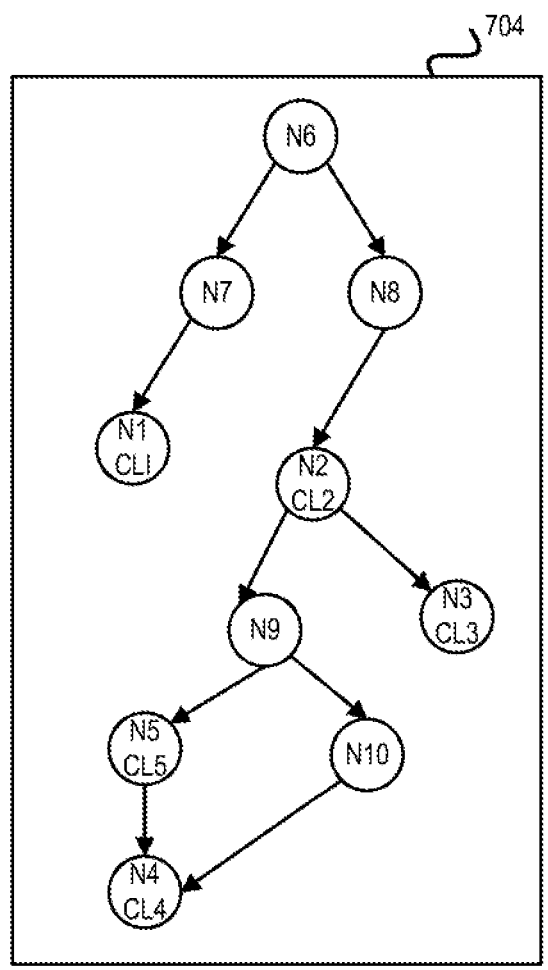
FIG. 7B illustrates an example of a DAG of nodes generated by document labeling system that includes ancestor nodes of the concept labels in the initial set of concept labels, according to some embodiments.

At block 606, using the reference hierarchy, document labeling system 110 identifies ancestor concept labels for each of the initial set of concept labels and adds nodes to the DAG to represent the ancestor concept labels and adds edges to the DAG to represent the hierarchical relationships. FIG. 7B illustrates an example of an updated DAG 704 generated by document labeling system 110 that includes ancestor nodes of the concept labels in the initial set of concept labels, according to some embodiments. The updated DAG 704 is generated based on identifying, based on reference hierarchy 124, a set of ancestor concept labels (ancestor nodes) for the concept labels (nodes) in the initial set of concept labels. In certain examples, for a concept label in the initial set of concept labels, the set of ancestor concept labels comprise multiple concept labels that are ancestors of the concept label in the reference hierarchy. In certain examples, the multiple concept labels are not in the initial set of concept labels. In certain embodiments, the updated DAG 704 generated by document labeling system 110 may include up to three levels of ancestor nodes. In certain examples, updating DAG 704 to add nodes corresponding to the set of ancestor concept labels may include adding connections to the DAG of nodes to represent hierarchical relationships between the nodes representing the set of ancestor concept labels and the nodes representing the concept labels in the initial set of concept labels.

In the illustrated example, updated DAG of nodes 704 represents hierarchical relationships between concept labels in the initial set of concept labels (CL1, CL2, CL3, CL4, and CL5) and their ancestor nodes N6, N7, N8, N9, and N10. In certain examples, each ancestor node (N6, N7, N8, N9, and N10) may represent a concept label from the reference set of concept labels in reference hierarchy 124. Each edge of updated DAG 704 represents an ancestor-descendent relationship between the initially selected nodes (i.e., the concept labels in the initial set of concept labels). If a node representing a concept label from the initial set of concept labels is a parent (or ancestor) of another node representing another concept label from the initial set of concept labels, an edge is added between them. In certain examples, the weight assigned to each edge of updated DAG 704 is determined based on the number of hops required to reach an ancestor node from a descendent node. In one example, the edge weight is represented as $a^k$ where k represents the number of hops and 'a' is a configurable parameter with a value between 0 and 1. In a certain implementation, the value of the configurable parameter 'a' may be 0.7 and stored by document labeling system 110 as part of configuration rules 132.

In certain examples, the weight of the (directed) edge in updated DAG 704 is an indication of how well a parent/ancestor concept can represent a child/descendant concept. As the number of hops required to reach from an ancestor node to a child/descendant node increases, the ability of the parent/ancestor node to represent a child/descendent node also decreases. In certain examples, the edge weight may be derived based on the similarity between two nodes. In other examples, the edge weight may be determined based on parent-child relationships (i.e., how well a parent node represents a child node). For instance, a parent concept label is a more abstract concept of the child concept label (i.e., the child concept label is a species of the parent concept label). Due to the sizable nature of the reference set of concept labels available in knowledge source 112 and the reference hierarchy 124 obtained using the reference set of concept labels, updated DAG (e.g., 704) generated (at block 606) using the reference hierarchy may also be relatively large. In certain embodiments, document labeling system 110 may further prune/reduce updated DAG (e.g., 704) to determine a final set of concept labels for the set of documents using the processing described in blocks 608-622 below.

At block 608, document labeling system 110 assigns a weight to each node of the updated DAG (e.g., 704) generated in block 606 based on relevance scores computed for the concept labels in block 302. In one example, each node representing a concept label from the initial set of concept labels is assigned a particular node weight and all other nodes (i.e., parent/ancestor nodes) are assigned a weight of zero. In certain embodiments, the node weight (also referred to herein as the importance score of the node) is computed as the sum of relevance scores of the concept label represented by that node across all semantic units (e.g., obtained in step 206) associated with the concept label. For example, if a concept label CL1 is associated with semantic units SU1, SU2 and SU3 and the relevance scores computed for CL1 in SU1, SU2 and SU2 respectively is 0.4, 0.6 and 0.7, the node weight for the concept label CL1 is computed as an aggregate (sum) of relevance scores which is equal to 1.7.

At block 610, document labeling system 110 computes a usefulness score for each node in the updated DAG (e.g., 704) based on the node weights computed in block 608. In certain embodiments, the usefulness score for a node is computed as shown in equation (3) reproduced below:

$$G_i = R_i + \sum_j (W_{ij} \times R_j) \quad \text{Equation 3}$$

where $R_1$ denotes the weight of the node computed in block 608 and $W_{ij}$ denotes the edge weight between node i and node j in the tree of nodes (e.g., 704).

In certain examples, the usefulness score $G_i$ of a node i represents the extent to which the node i captures the importance of all nodes that are descendants of node i. The usefulness score for a node is computed based on a weighted relevance score computed for the node and a weighted relevance score computed for one or more descendant nodes of the node in the updated DAG of nodes. In other words, the usefulness score $G_i$ represents the overall usefulness of a node i to represent a concept label for the set of documents when the $i^{th}$ node is chosen as a representative concept label for the set of documents. For instance, referring to the example of updated DAG 704 shown in FIG. 7B, the usefulness score G2 for node N2 (taking into consideration only nodes which have a non-zero node weight) is computed as shown in equation (4) below:

$$G2 = R2 + R5*a^2 + R4*a^3 + R3*a \quad (4)$$

where R2, R3, R4 and R5 refer to the weighted relevance scores (i.e., importance scores) of nodes N2, N3, N4 and N5 respectively and 'a' represents the edge weight between nodes N2 and N3, $a^2$ represents the edge weight between N2 and N5 and $a^3$ represents the edge weight between nodes N2 and N4.

Similarly, the usefulness scores G1 and G3-G10 for nodes N1 and N3-N10 respectively (taking into consideration only nodes which have a non-zero node weight) is computed as shown in equations (5-13) below:

$$G1 = R1 \quad (5)$$

$$G3 = R3 \quad (6)$$

$$G4 = R4 \quad (7)$$

$$G5 = R5 + R4*a \quad (8)$$

$$G6 = R1*a^2 + R2*a^2 + R3*a^3 + R4*a^5 + R5*a^4 \quad (9)$$

$$G7 = R1*a \quad (10)$$

$$G8 = R2*a + R3*a^2 + R4*a^4 + R5*a^3 \quad (11)$$

$$G9 = R4*a^2 + R5*a \quad (12)$$

$$G10 = R4*a \quad (13)$$

At block 612, document labeling system 110 selects a node from the updated DAG (e.g., 704) with the highest usefulness score.

At block 614, document labeling system 110 adds the concept label represented by the node selected in block 612 to a final set of concept labels for the set of documents and removes the selected node from the updated DAG of nodes to generate a newly updated DAG of nodes. In certain examples, the selected node in block 612 may represent a new (parent) concept label that was not in the initial set of concept labels determined in block 508 by document labeling system 110. Thus, in certain embodiments, the final set of concept labels for the set of documents may include a concept label not identified in the initial set of concept labels.

At block 616, document labeling system 110 performs a check to determine if a second threshold criterion has been satisfied. In certain examples, the second threshold criterion comprises a pre-configured threshold number (e.g., <=10) of concept labels to be added to the final set of concept labels. In other examples, the second threshold criterion may be reached when the sum of all (updated) usefulness scores of the nodes of the tree (e.g., 704) becomes less than a predefined fraction of the (initial) usefulness scores of the nodes in the tree. The second threshold criterion may be a pre-configured value set by document labeling system 110 for processing the set of documents and stored as part of configuration rules 132 in data store 116.

At block 616, if document labeling system 110 determines that the second threshold criterion is not satisfied, at block 618, document labeling system 110 re-computes the weight of each remaining node in the (newly updated) DAG of nodes and re-computes the usefulness score for each node in the DAG and the processing loops back to block 612 to select a (remaining) node from the (newly updated) DAG of nodes with the highest usefulness score. In certain embodiments, document labeling system 110 may not re-compute the weight of every remaining node in the newly updated DAG. For instance, in certain implementations, document labeling system 110 may determine a subset of the remaining nodes that are affected by the removal of the node in block 614 and only perform the computations for those subset of nodes. In certain embodiments, the node weight of each node is re-computed as shown in equation (14) reproduced below:

$$R_j = R_j \times (1 - W_{ij}) \quad \text{Equation 14:}$$

If the second threshold criterion is satisfied, in certain examples, at block 620, document labeling system 110 may optionally perform an additional check to ensure that every semantic unit is associated with at least one concept label from the final set of concept labels. At block 622, document labeling system 110 may add one or more concept labels from the initial set of concept labels to the final set of concept labels such that each semantic unit is associated with at least one concept label in the final set of concept labels. For example, as noted above, in certain embodiments, the final set of concept labels can include a new concept label included in the reference set of concept labels (e.g., a parent/ancestor node) that was not identified in the initial set of concept labels. Since the new concept label is not associated with any semantic unit in the ordered list of semantic units, in certain examples, document labeling system 110 may identify a semantic unit to associate to the new concept label based on identifying a hierarchical relationship between the new concept label and the other concept labels in the final set of concept labels (or the initial set of concept labels). For instance, if the new concept label is an ancestor/parent of one or more of the already selected concept labels, document labeling system 110 identifies one or more semantic units that are associated with these child/descendent concept labels and associates the identified semantic units with the new concept label.

If, at block 618 document labeling system 110 determines that the second threshold criterion is satisfied or, at block 620 document labeling system 110 determines that each semantic unit is associated with at least one concept label from the final set of concept labels, then the processing returns to block 214 of FIG. 2 to output information associated with the final set of concept labels for the set of documents. In certain examples, the final set of concept labels include concept labels that are distinct, non-overlapping, representative of and semantically relevant to the information represented by the set of documents.

Document labeling system 110 may output various types of information associated with a set of concept labels identified as being relevant to a set of documents to a user. FIG. 8 depicts various types of results output by the document labeling system to a user via a user interface, according to some embodiments. In certain embodiments, UI 104 may be presented to a user (e.g., user 106 in FIG. 1) by document labeling system 110 as part of the document labeling workflow. In certain examples, results 134 output to a user 106 may include a set of documents 800, a set (i.e., a final set of concept labels determined in block 614 of FIG. 6) of concept labels 802 determined by document labeling system 110 as being relevant to the set of documents 108 and usefulness scores associated with the concept labels. As noted above, the usefulness score is indicative of the overall usefulness (i.e., relevance) of the concept label to represent the contents of the set of documents. In certain examples, each concept label in the set of concept labels 802 may be presented to user 106 via UI 104 as circular bubbles and the size of each bubble may indicate the relative usefulness (i.e., the usefulness score) of the concept label. For instance, a concept label associated with a higher usefulness score is more relevant to (i.e., is a better representation of) the contents in the set of documents and hence may visually be represented by a larger bubble via UI 104 to the user.

In certain embodiments, user 106 may further interact with the results 134 displayed via UI 104 in a variety of ways. For example, user 106 may, using UI 104, navigate to particular paragraphs (i.e., semantic units) within a document by selecting a particular concept label from the set of concept labels 802. For instance, when user 106 selects a concept label CL1 from the set of concept labels 802 using UI 104, a set of documents (D1, D2) that include at least one semantic unit for which the particular concept label is identified as being applicable may be displayed to the user as shown in window 804 of UI 104. User 106 may further interact with the information displayed in window 804 to select a particular document, D2. Upon selecting the document D2, user 106 may view all semantic units (for e.g., paragraphs P1 and P2) within the document D2 for which the particular concept label is identified as being applicable.

In another example, user 106 may, using UI 104, navigate to concept labels associated with a particular document by selecting a document from the set of documents 108 displayed to the user. For instance, when user 106 selects a document D1 from the set of documents 108 using UI 104, a set of concept labels CL1 and CL2 (in the final set of concept labels) as being applicable to the document D1 may be displayed to the user as shown in window 806 of UI 104. User 106 may further select a particular concept label CL2 and be shown results similar to the results shown in window 804 for the concept label.

In other examples, user 106 may, using UI 104, navigate to concept labels associated with a particular semantic unit (i.e., a paragraph) by selecting a semantic unit in a document as shown in window 808 of UI 104. The set of documents 108 and set of concept labels 802 shown in FIG. 8 are for illustrative purposes. In other examples, results 134 output by document labeling system may include a different set and/or number of documents and concept labels associated with the documents. Additionally, the user interactions shown in windows 804, 806 and 808 of UI 104 are for illustrative purposes. In alternate embodiments, user 106 may perform different interactions to navigate to different semantic units (i.e., paragraphs) within the documents and/or select different concept labels associated with the documents.

Figure 11:
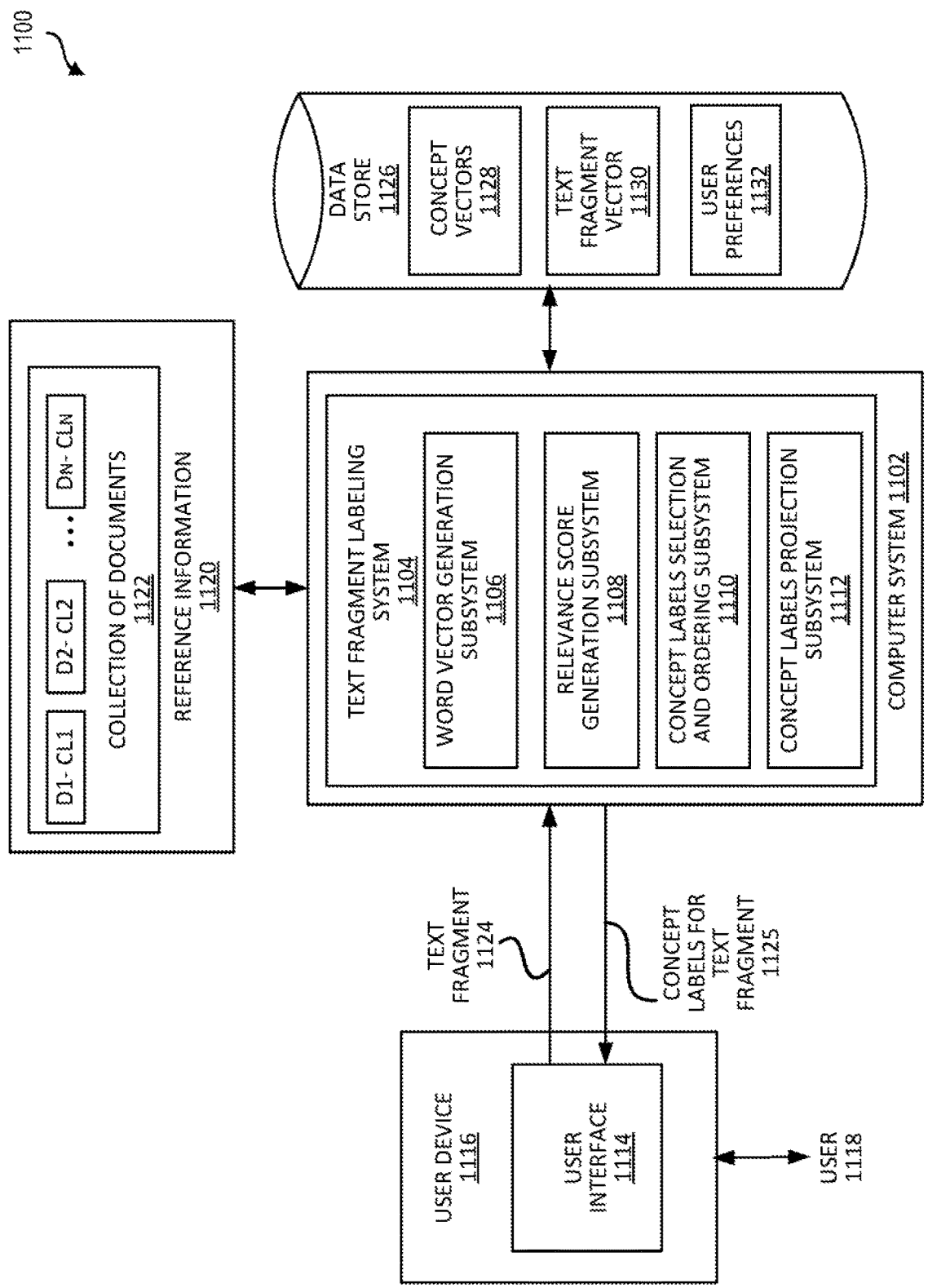
FIG. 11 depicts an example computing environment including a text fragment labeling system 1104 that is configured to process text fragments as disclosed herein according to certain embodiments.

Example Embodiment For Determining Concept Labels Applicable to a Semantic Unit and Computing Relevance Scores for Concept Labels Referring now to the drawings, FIG. 11 depicts an example computing environment 1100 including a text fragment labeling system 1104 that is configured to process text fragments as disclosed herein according to certain embodiments. Text fragment labeling system 1104 may be implemented by one or more computing systems 1102. For example, the one or more computing systems 1102 may execute computer-readable instructions (e.g., code, program) to implement text fragment labeling system 1104. As depicted in FIG. 11, text fragment labeling system 1104 includes various subsystems including a word vector generation subsystem 1106, a relevance score generation subsystem 1108, a concept labels selection and ordering subsystem 1110, and a concept labels projection subsystem 1112. Portions of data or information used by or generated by text fragment labeling system 1104 as part of its processing may be stored in a persistent memory such as data store 1126. The systems and subsystems depicted in FIG. 11 may be implemented using only software (e.g., code, instructions, program) executed by one or more processing units (e.g., processors, cores) of a computing system, hardware, or combinations thereof. The software may be stored on a non-transitory storage medium (e.g., on a memory device).

Computing environment 1100 depicted in FIG. 11 is merely an example and is not intended to unduly limit the scope of claimed embodiments. One of ordinary skill in the art would recognize many possible variations, alternatives, and modifications. For example, in some implementations, the text fragment labeling system 1104 can be implemented using more or fewer subsystems than those shown in FIG. 11, may combine two or more subsystems, or may have a different configuration or arrangement of subsystems.

As depicted in FIG. 11, a user 1118 may interact with text fragment labeling system 1104 using a user device 1116 that is communicatively coupled to text fragment labeling system 1104, possibly via one or more communication networks. User device 1116 may be of various types, including but not limited to, a mobile phone, a tablet, a desktop computer, and the like. User 1118 may interact with text fragment labeling system 1104 using an application (e.g., a browser) executed by user device 1116. For example, user 1118 may use a user interface (UI) 1114 (which may be a graphical user interface (GUI)) of an application executed by user device 1116 to interact with text fragment labeling system 1104. For example, user 1118 may, via UI 1114, select or input a text fragment 1124 and send a request to text fragment labeling system 1104 to determine concept labels for the text fragment 1124. The text fragment 1124 is then communicated from user device 1116 to text fragment labeling system 1104 for analysis.

Upon receiving the request from user device 1116, text fragment labeling system 1104 performs processing to identify a set of concept labels for the text fragment. The results 1125 of the processing performed by text fragment labeling system 1104 are then communicated back to the requesting user device 1116. These results 1125 may include concept labels identified by text fragment labeling system 1104 as being relevant to text fragment 1124, relevance scores associated with the concept labels, and possibly other information included in the results. The results 1125 along with the text fragment 1124 may be output to user 1118 via UI 1114. Details related to the processing performed by the various systems and subsystems in FIG. 11 for generating concept labels for a text fragment are described below with respect to the flowchart depicted in FIG. 12 and the accompanying description.

Figure 12:
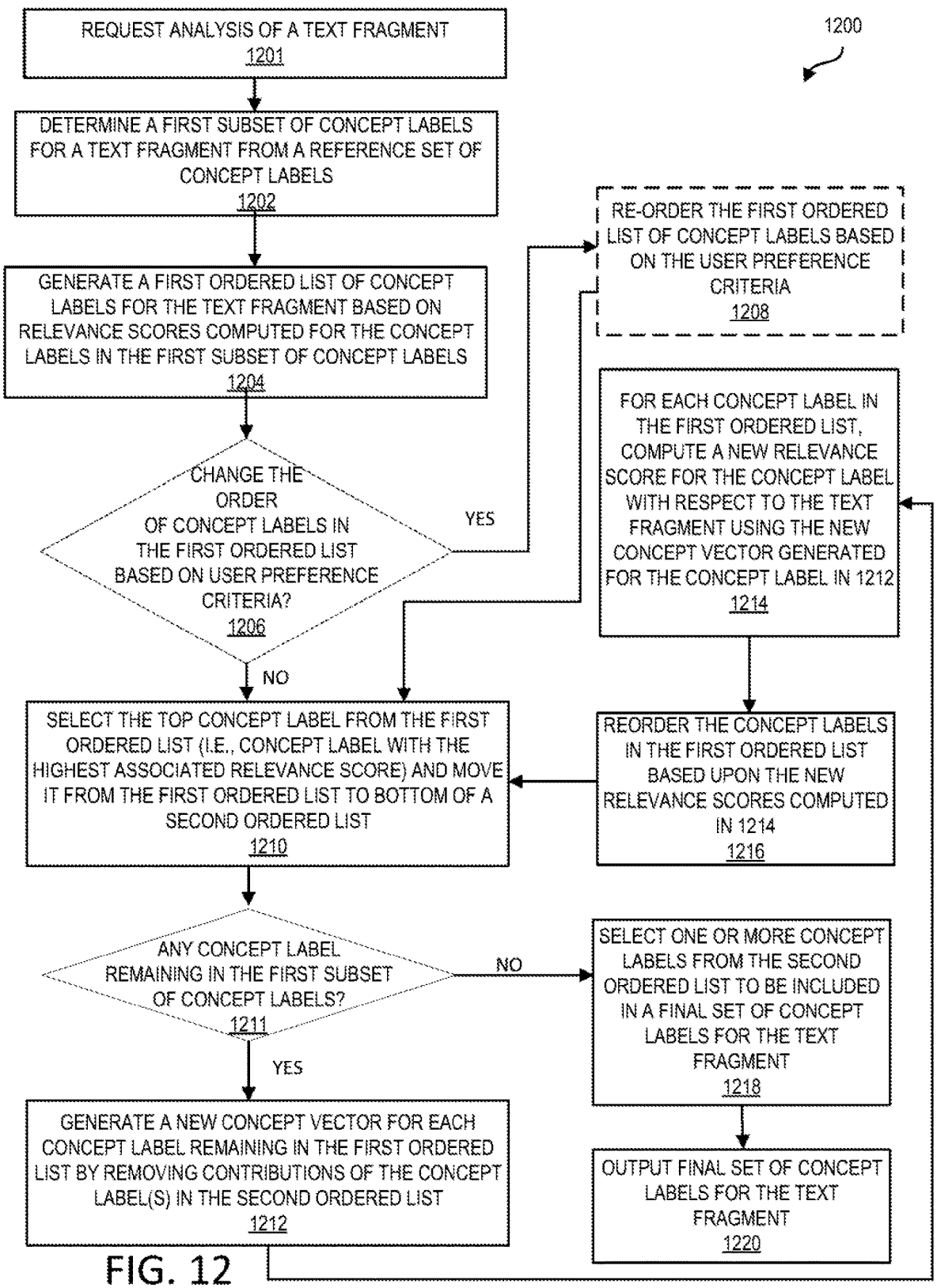
FIG. 12 depicts an example of a process for identifying concept labels for a text fragment, according to certain embodiments.

FIG. 12 depicts an example of a process 1200 for identifying concept labels for a text fragment, according to certain embodiments. The processing depicted in FIG. 12 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 1200 presented in FIG. 12 and described below is intended to be illustrative and non-limiting. Although FIG. 12 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 11, the processing depicted in FIG. 12 may be performed by text fragment labeling system 1104. In certain embodiments, within text fragment labeling system 1104, the processing in 1202-1220 may be performed by one or more subsystems of the text fragment labeling system.

In the embodiment depicted in FIG. 12, processing is initiated when, in 1201, a request is received requesting analysis of a text fragment. For example, text fragment labeling system 1104 may receive a signal from user device 1116 indicating that a user 1118 of the client device has requested a particular text fragment to be analyzed for purposes of identifying concept labels that are applicable for the text fragment. For example, in the embodiment depicted in FIG. 11, user 1118 may use UI 1114 to select a text fragment 1124 for which applicable concept labels are to be identified. This may then be communicated from user device 1116 to text fragment labeling system 1104.

The text fragment for which analysis is to be performed can be of different types. The text fragment may include multiple words, multiple lines, a paragraph, one or more portions of a paragraph or multiple paragraphs selected from one or more sources of information. In some examples, text fragment 1124 may represent lines selected from a single source of information (e.g., a document). For example, user 1118 may open a document using a text editor application executed by user device 1116 and then select a text fragment from the document. As another example, a user 1118 may select a text fragment from a web page displayed by a browser. The UI of the text application, or browser, or any other application may provide a user-selectable option that initiates a request for processing the selected text fragment and causes the request to be communicated to text fragment labeling system 1104. For example, a "Generate Concept Label" user-selectable option (e.g., a menu item, button) may be provided by UI 1114. User 1118 can select (e.g., click the button) this option to cause the request to be communicated to text fragment labeling system 1104, and which triggers the processing depicted in FIG. 12.

At block 1202, a first subset of concept labels including concept labels that are applicable for the text fragment are identified from a reference set of concept labels. The reference set of concept labels include a global set of concept labels from which concept labels applicable to the text fragment are selected. In certain embodiments, as part of the processing in 1202, for each concept label in the reference set of concept labels, a relevance score is computed for the concept label where the relevance score indicates a degree of applicability or relevance of the concept label to the contents of the text fragment. A first subset of concept labels is then determined for the text fragment by selecting concept labels from the reference set based upon the relevance scores computed for the concept labels.

Information regarding the reference set of concept labels may be stored in a knowledge base (e.g., reference information 1120 in FIG. 11). In certain examples, the reference set of concept labels correspond to titles of documents stored in reference information 1120. For example, as depicted in FIG. 11, reference information 1120 comprises a collection of documents 1122 (e.g., D1, D2, . . . Dn) and each document comprises information identifying a concept label. For example, document D1 may identify concept label CL1, document D2 may identify concept label CL2, and so on. In certain embodiments, each document contains some content and the concept label corresponds to the title of the document, where the title is representative of the contents of the document. In certain embodiments, text fragment labeling system 1104 uses the set of Wikipedia articles as the knowledge base for its processing. For example, the reference information 1120 includes Wikipedia articles and the titles of the Wikipedia articles are the concept labels. In such an embodiment, the titles of the Wikipedia articles make up the reference set of concept labels that is used by text fragment labeling system 1104 for its processing in FIG. 12 (and FIG. 3).

Reference information 1120 may be stored in a location accessible to text fragment labeling system 1104. The reference information may be stored in a location local to text fragment labeling system 1104 or in a remote location such as in a cloud storage location accessible to text fragment labeling system 1104. Text fragment labeling system 1104 then accesses this reference information and uses it for identifying concept labels that are representative of and semantically relevant to the information contained by the text fragment.

In certain examples, to facilitate the processing in 1202, the text fragment to be analyzed is represented by a text vector that is representative of the contents of the text fragment. Each concept label in the reference set of concept labels is also represented by a concept representation vector that is representative of the concept label. For example, in an embodiment where Wikipedia articles are used and the titles of the Wikipedia articles represent the reference set of concept labels, for each concept label in the reference set, the concept label corresponds to a particular title of a particular Wikipedia article and the concept representation vector for that concept label is representative of the contents of that particular Wikipedia article. The concept representation vector for a reference concept label may comprise a set of weights assigned to words that occur in a document corresponding to the concept label. In certain embodiments, the weights assigned to the words may be based upon the frequency of the words occurring in the document. For example, in the Wikipedia articles usage case, the concept representation vector for a particular Wikipedia article may be a multidimensional vector corresponding to words occurring in the particular Wikipedia article and the vector may include weights assigned to words where the weights are based upon the frequency of the words in that particular Wikipedia article. Additional details related to the processing performed in 1202 by text fragment labeling system 1104 for determining a first subset of concept labels for a text fragment is described in FIGS. 3-4.

Figure 13:
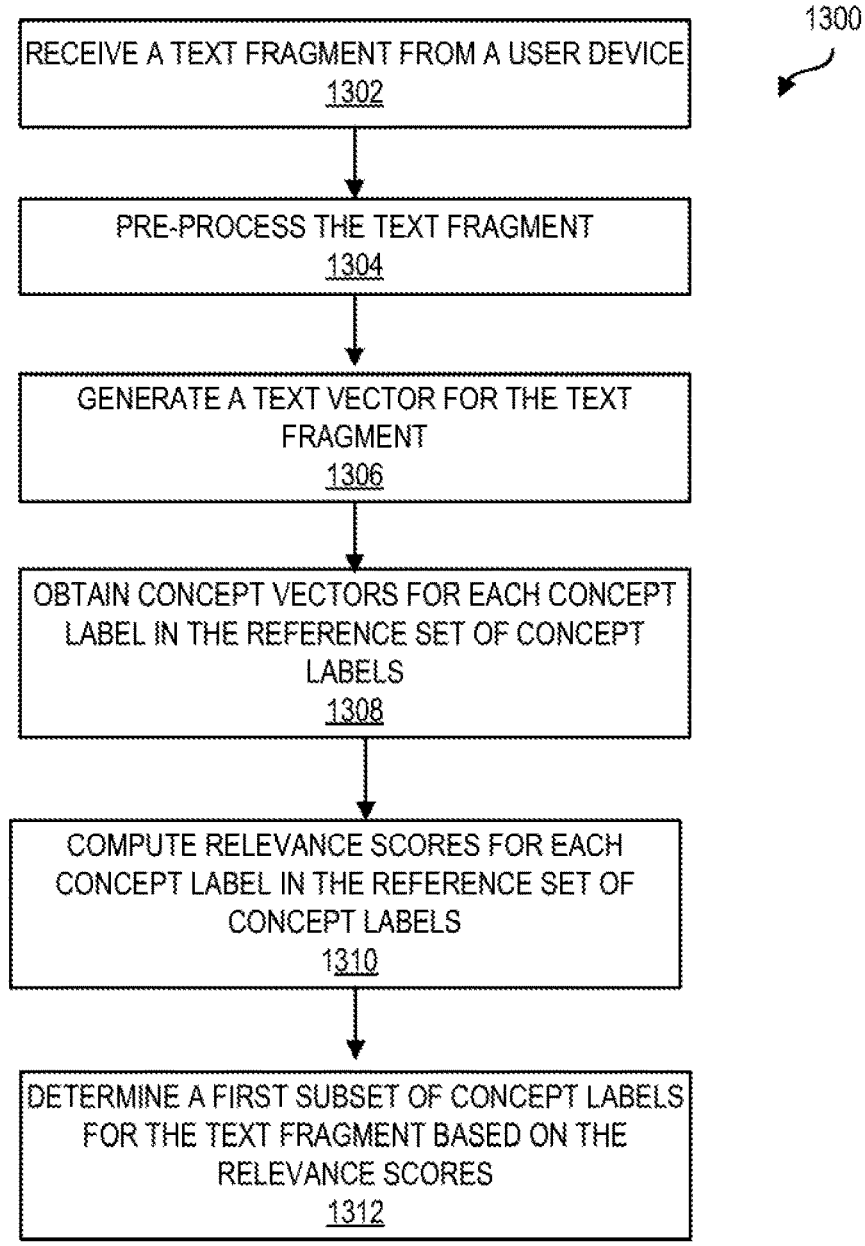
FIG. 13 depicts an example of a process for determining a first subset of concept labels for a text fragment based on relevance scores computed for the concept labels according to certain embodiments.

FIG. 13 depicts an example of a process 1300 for determining a first subset of concept labels for a text fragment according to certain embodiments. The processing depicted in FIG. 13 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 1300 presented in FIG. 13 and described below is intended to be illustrative and non-limiting. Although FIG. 13 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 13, the processing depicted in blocks 1302-1312 in FIG. 13 are performed by word vector generation subsystem 1106 and relevance score generation subsystem 1108 (e.g., as a result of executing step 1201 in FIG. 12) for the text fragment.

At block 1302, text fragment labeling system 1104 receives the text fragment from the user device. At block 1304, text fragment labeling system 1104 pre-processes the given text fragment. In some examples, pre-processing the text fragment involves cleaning and simplifying the content of the text fragment to derive meaningful features from the text fragment. Text fragment labeling system 1104 may utilize various Natural Language Processing techniques known in the art such as resolving co-referencing pronouns (e.g., when two or more expressions in a text refer to the same person or thing), removing stop words (e.g., commonly used words such as "the"), removing certain classes of characters such as numbers, special characters, and sequence of repeated characters, and lemmatization (a process which converts multiple related words to a single canonical form) to pre-process the given text fragment.

At block 1306, text fragment labeling system 1104 generates a word vector representation for the text fragment (also referred to herein as a "text fragment vector"). In certain examples, a text fragment vector for the text fragment comprises a set of "tf-idf" (term frequency—inverse document frequency) weights assigned to a set of words occurring in the text fragment. Details related to the processing performed by text fragment labeling system 1104 to generate a text fragment vector for a text fragment is described in FIG. 14.

At block 1308, text fragment labeling system 1104 obtains a word vector representation (i.e., a concept representation vector) for each concept label in the reference set of concept labels. Details related to the processing performed to generate concept representation vectors for concept labels is described in FIG. 14.

FIG. 14 illustrates an example of concept representation vectors generated for a reference set of concept labels and a text fragment vector generated for a text fragment, according to some embodiments. In certain embodiments, word vector generation subsystem 1106 within text fragment labeling system 1104 is configured to generate the concept representation vectors and the text fragment vector. In the embodiment shown in FIG. 14, each concept label {CL1, CL2, CL3, . . . CLn} is associated with a concept representation vector (1402A-1402N) representing the concept label. Each concept representation vector (1402A-1402N) is a vector representation of the content of a document corresponding to a concept label and is generated in a multi-dimensional vector space of words 1400. In certain examples, each concept representation vector (1402A-1402N) is represented as a set of "tf-idf" (term frequency—inverse document frequency) weights assigned to a set of words occurring in a document associated with a concept label {CL1, CL2, CL3, . . . CLn} representing the concept representation vector. As described herein, the "tf-idf" weight refers to a type of statistical measure that is used to evaluate the importance of a word occurring in a document associated with a concept label. A word from the multi-dimensional vector space of words 1400 that occurs in a concept label associated with a document is assigned a non-zero value in the concept representation vector for the concept label. A word that does not occur in the concept label is assigned a zero value in the concept representation vector for the concept label.

In a certain implementation, the "tf-idf" weight is composed of two terms: a term frequency (tf) and an inverse document frequency (idf). The term frequency (tf_di(w)) is a measure of how frequently a word 'w' occurs in a specific document di. The term frequency (tf) for a word is computed as shown in equation (1) and reproduced below:

$tf\_di(w)$=(Number of times word w appears in a document $di$)/ (Total number of words in a set of documents). Equation 15.

The inverse document frequency (idf) measures the importance of a word in the document and is computed as the logarithm of the total number of documents divided by the number of documents where the specific word appears. The inverse document frequency (idf) is computed as shown in equation (2) and reproduced below:

$idf(w)$=log 10(Total number of documents/Number of documents with word 'w' in it). Equation 16.

The "tf-idf" weight for a word for a given document is then computed as a product of the term frequency (tf) of the word in that document and its inverse document frequency (idf). For purposes of the example shown in FIG. 14, a document associated with the concept label CL1 may be composed of 100 words where a particular word "w1" appears 3 times in the document. The "tf_d1" for the word "w1" is computed as 3/100=0.03. If the reference set of concept labels comprises a hundred thousand concept labels, and the word "w1" appears in a 1000 of these concept labels, the "idf" for the word "w1" is computed as log(100000/1000)=2. Thus, the "tf-idf" weight of the word "w1" for the document associated with the concept label CL1 is the product of the "tf" and the "idf" for the word which is, 0.03*2=0.06.

In certain examples, the text fragment vector 1404 for the text fragment is generated in the same multi-dimensional vector space of words 1400 used to generate the concept representation vectors for the reference set of concept labels. In one example, the text fragment vector 1404 for the text fragment is represented as a set of "tf-idf" (term frequency—inverse document frequency) weights assigned to a set of words occurring in the text fragment. For instance, the tf-idf weight for a word "w1" in the text fragment vector for the text fragment is computed as a product of its "tf" and the "idf". For example, the text fragment vector for a text fragment T1 is represented as shown below:

Text Fragment Vector for $T1$=($tf\text{-}idf(W1)$, $tf\text{-}idf(W2)$, $tf\text{-}idf(W3)$, $tf\text{-}idf(Wn)$).

where tf(w1) is computed as the number of times a word "w1" appears in the text fragment divided by the total number of words in the text fragment and idf(w1) is computed as the logarithm of the total number of concept labels in the reference set of concept labels divided by the number of concept labels where the specific word appears.

In certain examples, the text fragment vector (e.g., obtained as a result of executing block 306) and the concept representation vectors (obtained as a result of executing block 1308) may be stored in data store 1126. In certain examples, the text fragment vector and the concept representation vectors may be represented and stored as compatible vectors/matrices having corresponding equal dimensions of rows and columns for comparison and similarity analysis as discussed below.

Data store 1126 may be an internal or external persistent storage location utilized by text fragment labeling system 1104 for storing portions of data or information used by or generated by text fragment labeling system 1104 as part of its processing. For instance, data store 1126 may store a set of concept representation vectors 1128 for the reference set of concept labels and a text fragment vector (e.g., 1130) generated for a text fragment. In certain instances, as part of the processing performed in block 1308, word vector generation subsystem 1106 may be configured to periodically determine if reference information 1120 has changed and generate new and/or modified concept representation vectors for the newly added/modified documents in reference information 1120. Similarly, word vector generation subsystem 1106 may be configured to periodically delete concept representation vectors (e.g., stored in data store 1126) for documents that have been deleted in reference information 1120. In this manner, word vector generation subsystem 1106 generates and maintains an updated set of concept representation vectors 1128 for the reference set of concept labels corresponding to the collection of documents 1122.

Returning to the discussion of FIG. 13, at block 1310, the processing involves computing a relevance score for each concept label in the reference set of concept labels. The relevance score is indicative of a degree of relevance of each concept label to contents of the text fragment and is computed using the concept representation vector for the concept label. In one approach, the relevance score for each concept label in the reference set of concept labels is computed by determining the degree of relevance between each concept representation vector associated with each concept label and the text vector. In one implementation, the degree of relevance is determined by computing the cosine similarity between each concept representation vector associated with each concept label and the text vector. The relevance score for each concept label in the reference set of concept labels is then computed based on the cosine similarity. In one example, the cosine similarity is computed as a function (i.e., a cosine) of the angle between each concept representation vector associated with the concept labels and the text fragment vector for the text fragment in the multi-dimensional vector space of words. The cosine similarity between two vectors (e.g., a concept labels vector $\vec{a}$ and the text fragment vector $\vec{b}$) may be computed as shown in Equation (3) and reproduced below:

$$\cos\theta = \frac{\vec{a}\cdot\vec{b}}{\|\vec{a}\|\,\|\vec{b}\|} = \frac{\sum_{1}^{n} a_i b_i}{\sqrt{\sum_{1}^{n} a_i^2}\,\sqrt{\sum_{1}^{n} b_i^2}} \quad \text{Equation 17}$$

where $\vec{a}\cdot\vec{b}=\sum_{1}^{n}a_i b_i=a_1 b_1+a_2 b_2+\ldots+a_n b_n$ is the dot product of the two vectors.

At block 1312, a first subset of concept labels are determined based on the relevance scores computed in 1310. In some examples, the first subset of concept labels may include all the concept labels in the reference set of concept labels. In other examples, the first subset of concept labels may be selected by identifying concept labels in the reference subset of concept labels having relevance scores greater than a certain threshold value. The threshold value may be a pre-configured value (e.g., between 0-1) that is set by text fragment labeling system 1104 while processing text fragments.

Returning to the discussion of FIG. 12, as described above, in 1202, a first subset of concept labels is determined for the text fragment based upon relevance scores computed for the concept labels in the reference set of concept labels and the text fragment. At block 1204, the concept labels in the first subset of concept labels are ordered based upon their associated relevance scores (e.g., the relevance scores computed in FIG. 13) to generate a first ordered list of concept labels for the text fragment. In certain embodiments, the concept labels are ordered in descending order based upon their associated relevance scores such that the concept label with the highest associated relevance score is at the top of the first ordered list and the concept label with the lowest relevance score is at the bottom of the first ordered list, and in general, a concept label with a higher associated relevance score is placed higher in the first ordered list than a concept label with a lower relevance score.

In certain examples, at block 1206, a check is performed (e.g., by concept labels selection and ordering subsystem 1110) to determine whether the order of the concept labels in the first ordered list (generated in block 1204) should be changed or modified based upon other criteria such as user preference criteria or user inputs. If it determined in 1206 that the order is to be changed, then the first ordered list is reordered in 1208 (e.g., by concept labels selection and ordering subsystem 1110) and processing then continues with block 1210. If it is determined in 1206 that no change is to be made, then processing proceeds with block 1210. In certain embodiments, the processing performed in blocks 1206 and 1208 is optional.

Various different conditions may cause the first ordered list to be reordered in 1208. In certain embodiments, concept labels selection and ordering subsystem 1110 may determine whether or not the first ordered list is to be reordered based upon user input, user preferences, or other criteria. For example, in some instances, information identifying the order of the concept labels in the first ordered list may be output to the user, the user given the choice of changing the order. The user may provide inputs indicating a change in the order via UI 1114. For example, the user may indicate that a particular concept label in the first ordered list is to be moved from its current position in the first ordered list to the top of the first ordered list. Text fragment labeling system 1104 may receive this user preference input and change the order of the concept labels in the first ordered list of concept labels such that the user selected concept label is placed at the top of the first ordered list.

As another example, text fragment labeling system 1104 may decide to automatically, without any user input, change the order of concept labels in the first ordered list based upon user preferences, such as prior user history. For example, the user may have indicated in the past that a particular concept label is to be placed at the top of the first ordered list (e.g., potentially because that particular concept label is of importance to the user). Alternatively, text fragment labeling system 1104 may determine based upon information stored for the user that a particular concept label is preferred or is of importance to the user. Text fragment labeling system 1104 may use this information to change the order of the concept labels in the first ordered list in 1208 such that the particular concept label is placed at a higher position in the first ordered list than its original position. Accordingly, in some situations, the first ordered list may be automatically re-ordered in 1208 based on user's past preference information 1132 (stored in data storage system) that indicates the user's preference towards certain concept labels which are in the first ordered list of concept labels.

At block 1210, the concept label at the top of the first ordered list is selected and moved from the first ordered list to the bottom of a second ordered list. The second ordered list is initialized to a null set at the start of the processing depicted in FIG. 12.

At block 1211, a check is made to determine if a threshold condition is met. In certain examples, the threshold condition is met when there are no more concept labels remaining in the first ordered list, i.e., all concept labels in the first ordered list have been processed and moved to the second ordered list. In some embodiments, in addition to the checking for any concept labels in the first ordered list, additionally a check is made to see if a threshold number of concept labels are already included in the second ordered list of concept labels. If the threshold condition is met, then the processing proceeds to block 1218 (described below) to select one or more concept labels from the second ordered list to be included in a final set of concept labels for the text fragment. If the threshold condition in 1211 is not met, then the processing proceeds with block 1212.

At block 1212, for each concept label remaining in the first ordered list, a new concept representation vector is generated for the concept label by removing, from the concept representation vector originally generated for the concept label, the contributions of the concept label(s) in the second ordered list. The new concept representation vector reflects the contribution of that particular concept label by removing the contributions of the concept labels in the second ordered list. In the embodiment depicted in FIG. 11, concept labels projection subsystem 1112 within text fragment labeling system 1104 is configured to generate the new concept representation vectors for the concept labels.

Various different techniques may be used to generate the new concept representation vectors in 1212. In certain examples, the new concept representation vector for each concept label in the first ordered list of concepts labels is generated using a Gram-Schmidt orthogonalization technique. In one approach, the new concept representation vectors (also referred to herein as the orthonormal vector representations) for the concept labels may be computed as shown in equation (4) and reproduced below:

$$\phi_i = c_i - \sum_{k=1}^{i-1}(c_i \cdot \phi_k)\phi_k \quad \text{Equation 18}$$

where $\{\phi_1, \phi_2, \ldots, \phi_n\}$ denote the orthonormal vector representations for a set of concept labels and $(c_i \cdot \phi_k)\phi_k$ denotes the projection operator that projects the vector $c_i$ orthogonally onto the line spanned by the vector $\phi_i$. For instance, based on equation (4), the orthonormal vector representation ($\phi_2$) for a concept label CL2 is a unit vector generated by projecting the concept representation vector for the concept label CL2 onto the concept representation vector for the concept label CL1 to remove the contribution of CL1 in the concept representation vector for CL2. The orthonormal vector representation ($\phi_2$) for concept label CL2 thus a unit vector representation of CL2 without the contributions of the concept label CL1 and its coefficient represents the contribution of CL2 without the contribution due to CL1. Based on the orthonormal vector representation ($\phi_2$), the relevance scores associated with the concept label CL2 are recomputed.

At block 1214, for each concept label in the first ordered list, a new relevance score is computed for the concept label with respect to the text fragment using the new concept vector generated for the concept label in block 1212. In certain examples, re-computing a relevance score for a concept label comprises determining a degree of similarity (e.g., cosine similarity) between the text fragment vector for the text fragment and the new concept representation vector (orthonormal vector representation) generated for the concept label in 1212. In one implementation, the degree of similarity is determined by computing the cosine similarity between the text fragment vector for the text fragment and the new concept representation vector (orthonormal vector representation) generated for the concept label. The new relevance score for each concept label in the first ordered list of concept labels is then computed based on the cosine similarity. The new relevance value computed for a concept label in 1214 may be the same as or different from relevance values previously computed for the concept label in 1202 or in previous iterations of 1214. Details regarding the manner in which the cosine similarity between two vectors can be determined is discussed with respect to FIGS. 3-4.

At block 1216, the concept labels remaining in the first ordered list are reordered based upon the new relevance scores computed in block 1214. Processing then continues with block 1210.

As previously described above, in 1206 and 1208, the ordering of the concept labels in the first ordered list may be changed based upon user inputs or preferences, or other criteria. In certain embodiments, after the reordering of the concept labels in the first ordered list in 1216, the ordering of the concept labels in the reordered first ordered list may optionally be changed based upon user inputs or preferences, or other criteria. For example, the user may be given the option of providing input to change the order of the concept labels in the first ordered list. The first ordered list with the changed ordering is then used for the subsequent processing 1210.

The second ordered list identifies the concept labels selected from the first ordered list and the order of the concept labels in the second ordered list indicates the order in which the concept labels were selected from the first ordered list and moved to the second ordered list. The higher the position of a concept label in the second ordered list, the more relevant or applicable the concept label is to the text fragment. In certain embodiments, the number of concept labels in the second ordered list is lesser than the number of concept labels in the first ordered list, i.e., the first ordered list includes at least one concept label that is not included in the second ordered list.

After the threshold condition in 1211 is met and processing proceeds with 1218, the second ordered list includes one or more concept labels selected from the first subset of concept labels, and the order of the concept labels in the second ordered list indicates the order in which the concept labels were selected for inclusion in the second ordered list. The higher the position of a concept label in the second ordered list, the more relevant the concept label is to the text fragment compared to a concept label positioned lower in the second ordered list.

At block 1218, a final set of concept labels for the text fragment is generated by selecting one or more concept labels from the second ordered list of concept labels. In certain examples, all the concept labels in the second ordered list may be selected for inclusion in the final set. In other examples, a top few (e.g., top 5, top 10, etc.) concept labels from the second ordered list may be selected for inclusion in the final set. In certain embodiments, the number of concept labels to be included in the final set of concept labels may be pre-configured. The relative ordering of the selected concept labels from the second ordered list is also retained in the final set. In certain embodiments, the final set is itself an ordered list that includes the top "X" concept labels from the second ordered list and the ordering of the concept labels is per their ordering in the second ordered list.

At block 1220, information identifying the concept labels in the final set of concept labels is output to the requesting user. For example, information related to the final set of concept labels may be communicated from text fragment labeling system 1104 to user device 1116 and output to user 1118 via UI 1114. The information output to the user may identify the concept labels in the final set and also identify the order of the concept labels in the second ordered list, where the order indicates a degree of applicability of the concept label to the text fragment. A concept label placed higher in the second ordered list is more applicable or relevant to the text fragment than a concept label lower placed in the second ordered list. In certain embodiments, relevance scores associated with the concept labels in the final set of concept labels may also be output. For example, for a concept label, the relevance score associated with the concept label when the concept label was selected for inclusion in the second ordered list may be output. In other embodiments, other information may be output indicating a degree of relevance of the concept labels to the text fragment.

As a result of generating new concept representation vectors in block 1212, the computing of new relevance scores in block 1214, reordering of the first ordered list based upon the recomputed relevance scores in block 1216, and selecting the top concept label from this reordered first ordered list in 1210 for inclusion in the second ordered list, and then selection of concept labels from the second ordered list for inclusion in the final set of concept labels per the processing 1218, concept labels that are more independent (e.g., more distinct with reduced overlap in the meaning conveyed by the concept labels) of each other are more likely to be selected in the second ordered list and subsequently in the final set of concept labels. This is enabled due to the generation of the new concept representation vectors in 1212 since the contributions of the concept labels already selected in the second ordered list are removed during the regeneration of the new concept representation vectors. The selected concept labels are not only distinct with reduced overlap but also representative of and semantically relevant to the information represented by the text fragment. The concept labels selected in the final set and their order thus conveys more useful information about the contents of the text fragment than conventional techniques.

The processing performed by text fragment processing system in blocks (1212-1220) can be better understood using the following example. For example, concept labels projection subsystem 1112 may generate a first ordered list of concept labels comprising three concept labels {CL1, CL2, CL3} for a text fragment that are ordered in decreasing order of their respective relevance scores {R1, R2, R3}. As an example, assume that the concept labels {CL1, CL2, CL3} correspond to{CL1: Edinburg University Press , CL2: Research University, CL3: Cosmogony} respectively. Concept labels, CL1: A and CL2: B are highly correlated because both these concept labels are linked to similar information. These concept labels are also highly relevant to the content described in the text fragment because they are both associated with high relevance scores. However, the information gained by assigning two highly correlated concept labels such as CL1 and CL2 to a text fragment is minimal and only contributes to a marginal information gain in the set of the concept labels identified for the text fragment.

In certain examples, this information is captured in the orthonormal vectors $\phi_1$ and $\phi_2$ generated for the concept labels. Due to the high correlation between these concept labels, concept label CL2 will have a significant contribution of CL1, and once the contribution of CL1 is removed by orthonormalizing the concept representation vector for CL2 to produce $\phi_2$, the relevance score for CL2 also decreases. The new (i.e., re-computed) relevance score thus acknowledges the additional contribution that the concept label CL2 makes to the text fragment, i.e., in addition to the concept label CL1 already selected for the text fragment. In some instances, the text fragment labeling system reduces the inclusion of the concept label (CL2: Research University) if the contribution of this concept label to the text fragment is minimal. For example, after the generation of the new concept representation vectors and the reordering of the concept labels based on the re-computed (new) relevance scores, the re-ordered list that is generated may be as follows: {CL1: Edinburg University Pres , CL3: Cosmogony; CL2: Research University} and only CL1 and CL3 may be selected for the text fragment. In this manner, the text fragment labeling system intelligently determines concept labels for a text fragment that are both meaningful (i.e., distinct and non-overlapping) and semantically relevant to the information represented by the text fragment.

Additional details related to the operations performed by text fragment labeling system 1104 and the subsystems (e.g., word vector generation subsystem 1106, relevance score generation subsystem 1108, concept labels selection and ordering subsystem 1110 and concept labels projection subsystem 1112) within text fragment labeling system 1104 to identify concept labels for a text fragment are now described using the following examples.

As described above, for identifying concept labels relevant to the text fragment, text fragment labeling system 1104 starts with using the reference set of concept labels and identifies a first subset of concept labels from the reference set that are relevant for the text fragment. For example, the reference set of concept labels may correspond to titles of Wikipedia articles, in which case the reference set of concept labels can include 30 million to 40 million reference concept labels. Further, given the nature of Wikipedia, the corpus of Wikipedia articles is dynamic and ever growing and thus the reference set is dynamic. The first subset of concept labels that is identified for the text fragment from the reference set may include a very reduced subset of concept labels from the reference set. For example, in typical embodiments (although this is not intended to be limiting), the number of concept labels in the first subset may be a small percentage of the concept labels in the reference set (e.g., less than 10% of the reference set, less than 1% of the reference set, etc.). For example, in the case of Wikipedia articles, the number of concept labels in the first subset of concept labels may be less than a hundred concept labels. Finally, the number of concept labels in the final set of concept labels for the text fragment is a small subset of the concept labels in the first subset. For example, the final set may include 1-10, 1-20, etc. concept labels. In this manner, text fragment labeling system 1104 can use a large number of concept labels as reference and identify a small user-friendly number of concept labels relevant for the text fragment. Further, as described above, the concept labels in the final set are carefully chosen such that the concept labels are independent and there is reduced overlap in meaning between the concept labels.

EXAMPLE #1

The first example shown below illustrates the manner in which concept labels can be determined for an exemplary text fragment, T1 shown below:

---

Before we go into the weird and wonderful depth of trying to explain this question, we first have to understand what is meant when we refer to the word 'universe'. The universe is everything. It is all the galaxies, stars black holes and planets, right down to matter, particles and energy. It is the "total sum of all that exists, the physical system that encapsulates all known space" (reference no. 5). But where did it come from? It all stems from the Big Bang theory, which suggests that if the universe is expanding, there must have been a point (ie right at the beginning of time) where the universe existed as a single particle, of infinite density. It is important to remember that the Big Bang theory represents not only the beginning of the universe, but also the beginning of time itself, about 15 billion years ago. As Stephen Hawking suggests, the beginning of real time would have been a singularity, at which the laws of physics would have broken down.

---

Text Fragment—T1

The word vector representation (i.e., the text fragment vector) for the text fragment T1 is shown below. In one example, the text fragment vector is generated as a result of executing step 1306 of FIG. 13 after processing is applied on the text fragment (e.g., in step 1304 of FIG. 13).

--- universe-26.4498, beginning-16.5259, bang-15.8362, encapsulates-12.3376, suggests-12.2646, we-12.2041, hawking-11.2119, singularity-11.0102, theory-10.6629, galaxies-10.3344, ie-9.3392, weird-8.5558, particle-8.5327, big-8.4115, planets-8.3181, particles-8.2777, infinite-8.0821, stems-7.9499, holes-7.6323, wonderful-7.6057, right-7.1643, sum-6.9848, expanding-6.9797, remember-6.9617, explain-6.8966, physics-6.5538, understand-6.4301, depth-6.2887, exists-6.2638, billion-6.1996, ago-6.1972, existed-6.1551, represents-5.9331, density-5.8823, everything-5.7627, question-5.6922, laws-5.6871, trying-5.5881, meant-5.5672, matter-5.5528, broken-5.4848, stephen-5.2464, energy-5.1973, physical-5.0495, reference-5.0384, word-4.8859, stars-4.7542, refer-4.6359, space-4.4711, must-4.3854, itself-4.3581, real-4.2538, come-4.2024, go-3.9362, important-3.8349, black-3.6683, point-3.5599, system-3.3705

---

Text Fragment Vector for Text Fragment T1

The example further illustrates a concept representation vector generated for a concept label CL1 (titled "Cosmogony"). For instance, the concept representation vector for the concept label CL1 can be obtained as a result of executing step 1308 of FIG. 13. In this example, the concept label CL1 is associated with a document in the collection of documents 1122 stored in reference information 1120. In certain embodiments, the document represents a Wikipedia article and the title ("Cosmogony") of the Wikipedia article represents the concept label CL1 for the article. It should be noted that for purposes of illustration, only a partial portion of the concept representation vector for the concept label CL1 is shown below.

---

Universe-152.0861, cosmogony-106.8686, singularity-66.0615, cosmology-60.2629, theory-53.3143, myths-52.0075, theories-50.2050, cosmological-44.9724, creation-41.4227, string-31.9529, scientific-31.9385, bang-31.6724, cosmos-27.8042, origin-26.2813, quantum-24.8404, existence-22.6350, mythology-22.4256, hawking-22.4239, gods-22.1326, theoretical-21.7024, physicists-20.5308, planck-19.9881, emerged-19.1934, instance-18.6631, space-17.8844, scenarios-17.8178, explanations-17.8048, ideas-17.5852, cosmic-17.1651, big-16.8231, regarding-16.7849, genesis-15.9139, myth-15.5397, gravity-15.4426, humanities-15.3964, proposed-15.1106, egg-15.0552, explanation-14.4320, ruler-14.0778, moments-14.0087, model-13.8024, explain-13.7932, explains-13.6648, characteristic-13.5427, researchers-13.3871, testable-13.1843, jove-12.7288, extrapolation-12.3376, does-12.2693, untested-12.1127, koine-11.9694, origins-11.9216, copulation-11.8187, boundless-11.7954, earliest-11.6603, primeval-11.4966, astrophysical-11.3856, exist-11.3335, limitless-11.3059, sumerian-11.1509, yau-10.8475, inquire-10.8048, formulating-10.7362, exemplifies-10.7220, frye-10.7116, speculations-10.5676, created-10.5461, greek-10.4925, behaves-10.4903, northrop-10.3428, metamorphosis-10.3165, accepted-10.2714, metaphysical-10.0876, whether-10.0198

---

Concept Representation Vector for Concept Label CL1—"Cosmogony"

The example further illustrates a set of concept labels corresponding to a collection of documents 1122 stored in reference information 1120 along with relevance scores determined for the set of concept labels. In one example, the relevance scores for the set of concept labels may be computed as a result of executing step 1310 of FIG. 13. The set of concept labels may further be ordered in accordance with their relevance scores (e.g., as a result of executing step 1204 of FIG. 12) to generate a first ordered list of concept labels for the text fragment T1 as illustrated below:

---

| First Ordered List of Concept labels | Relevance Scores |
| --- | --- |
| Cosmogony | 0.15388619396361028 |
| Ultimate fate of the universe | 0.12141928327424031 |
| Research university | 0.09409601500462107 |
| Big South Conference | 0.07946370555075907 |
| Edinburgh University Press | 0.07824614004739879 |

---

Ordered List of Concept Labels and Their Corresponding Relevance Scores

In certain embodiments, and as discussed in relation to FIG. 12, the order of the concept labels in the first ordered list of concept labels may be changed based on input received from a user 1118 of user device 1116. For instance, for purposes of this example, concept labels selection and ordering subsystem 1110 may change the first ordered list of concept labels by moving the concept label "Ultimate fate of the universe," to the top of the first ordered list based on the input received from the user and generate a re-ordered list of concept labels as shown below:

| Re-Ordered List of Concept labels | Relevance Scores |
|---|---|
| Ultimate fate of the universe | 0.12141928327424031 |
| Cosmogony | 0.15388619396361028 |
| Research university | 0.09409601500462107 |
| Big South Conference | 0.07946370555075907 |
| Edinburgh University Press | 0.07824614004739879 |

Re-Ordered List of Concept Labels Based Upon User Input

In certain examples, as discussed in FIG. 12, based on new concept representation vectors generated for the concept labels, the relevance scores for the concept labels are re-computed and a second ordered list of concept labels are identified for the text fragment based on the re-computed (new) relevance scores. In certain examples, the second ordered list may be ordered in descending order with the concept labels with the highest relevance score placed at the top of the second ordered list.

| Second Ordered List of Concept labels | Re-computed Relevance Scores |
|---|---|
| Ultimate fate of the universe | 0.5099698798942952 |
| Cosmogony | 0.44718895634482464 |
| Big South Conference | 0.029660083838299493 |
| Edinburgh University Press | 0.009947334592092034 |
| Research University | 0.003233745330488638 |

Second Ordered List of Concept Labels with Re-Computed (New) Relevance Scores

In certain instances, the re-computed (new) relevance scores may be normalized prior to outputting the concept labels and their associated relevance scores to the user. The normalization is performed to re-adjust the re-computed relevance scores so that they can be represented on a scale of values ranging from 0-1. It may be observed that as a result of re-computing relevance scores, the re-computed relevance score for the concept label "Big South Conference," and the re-computed relevance score for the concept label "Edinburgh University Press" are now higher than the re-computed relevance score for "Research university." Thus, by re-computing the relevance scores for the set of concept labels determined for the text fragment, the contribution of the concept label, "Research university," has been reduced.

In certain examples, based upon the generated second ordered list, one or more concept labels are selected to be included in a final set of concept labels for the text fragment. In certain examples, from this second ordered list of concept labels, the top three concept labels, namely, "Ultimate fate of the universe," "Cosmogony," and "Big South Conference," may be selected for the text fragment as shown below. The concept labels are then associated with the text fragment and output as being representative of the information contained in the text fragment. In certain embodiments, for each concept label corresponding to the selected concept labels, the re-computed relevance scores associated with those concept labels is also output along with the concept labels as shown below.

| Final Set of Concept labels | Re-computed Relevance Scores |
|---|---|
| Ultimate fate of the universe | 0.5099698798942952 |
| Cosmogony | 0.44718895634482464 |
| Big South Conference | 0.029660083838299493 |

Final Set of Concept Labels with Re-Computed (New) Relevance Scores

EXAMPLE #2

A second example illustrating an exemplary text fragment, T2, for which concept labels are to be determined is now described.

There have been many different theories about the origins of the universe, however the most commonly regarded theory is that of the big bang and the expanding universe. In this report I will show evidence to confirm the theory of the big bang. The universe it described as "everything there is all matter and all energy, with an infinite amount of space". The age of the universe is predicted to be around 15 × 10 Hubble's constant is the current expansion rate of the universe and is derived from the speed of recession of stars from a certain distance away.

Text Fragment—T2

A first ordered list of concept labels for the text fragment based on relevance scores computed for the concept labels is shown below. In this example, the concept labels are ordered in accordance with a default order (i.e., a decreasing order) of their corresponding relevance scores to generate the first ordered list of concept labels as illustrated below:

| First Ordered List of Concept Labels | Relevance Scores |
|---|---|
| Ultimate fate of the universe | 0.1518127973383566 |
| Cosmogony | 0.1271520502468453 |
| Big Bang (book) | 0.1032342532178822 |
| Research university | 0.08867455376533855 |
| Aristotle's theory of universals | 0.08205311400495276 |

First Ordered List of Concept Labels and Their Corresponding Relevance Scores

In certain examples, as discussed in FIG. 12, based on new concept representation vectors generated for the concept labels, the relevance scores for the first ordered list of concept labels are then re-computed and a second ordered list of concept labels are generated for the text fragment based on the re-computed relevance scores as shown below:

| Second Ordered List of Concept labels | Re-computed Relevance Scores |
|---|---|
| Ultimate fate of the universe | 0.5762376313244817 |
| Big Bang (book) | 0.2548675922975078 |
| Cosmogony | 0.14656443584988582 |
| Aristotle's theory of universals | 0.01769961879374618 |
| Research university | 0.00463072173437859 |

Second Ordered List of Concept Labels with Re-Computed Relevance Scores

It may be observed that as a result of re-computing relevance scores, the re-computed relevance score for the concept labels "Big Bang Book," and "Aristotle's theory of universals" are higher than their previously computed relevance scores. Thus, as a result of re-computing the relevance scores, the relevance of the concept labels "Big Bang Book," and "Aristotle's theory of universals" has increased and the relevance of the concept label "Cosmogony" has reduced. In certain examples, from this second subset of concept labels, the top three concept labels, namely, "Ultimate fate of the universe," "Big Bang (book)," and "Cosmogony," may be selected for the text fragment. The concept labels are then associated with the text fragment and output as being representative of the information contained in the text fragment. In certain embodiments, for each concept label corresponding to the selected concept labels, the re-computed relevance scores associated with those concept labels is also output along with the concept labels.

The present disclosure addresses several deficiencies of conventional tools by providing an intelligent and improved technique for identifying concept labels for a text fragment where the identified concept labels are distinct, non-overlapping, representative of and semantically relevant to the information contained by the text fragment.

Figure 9:
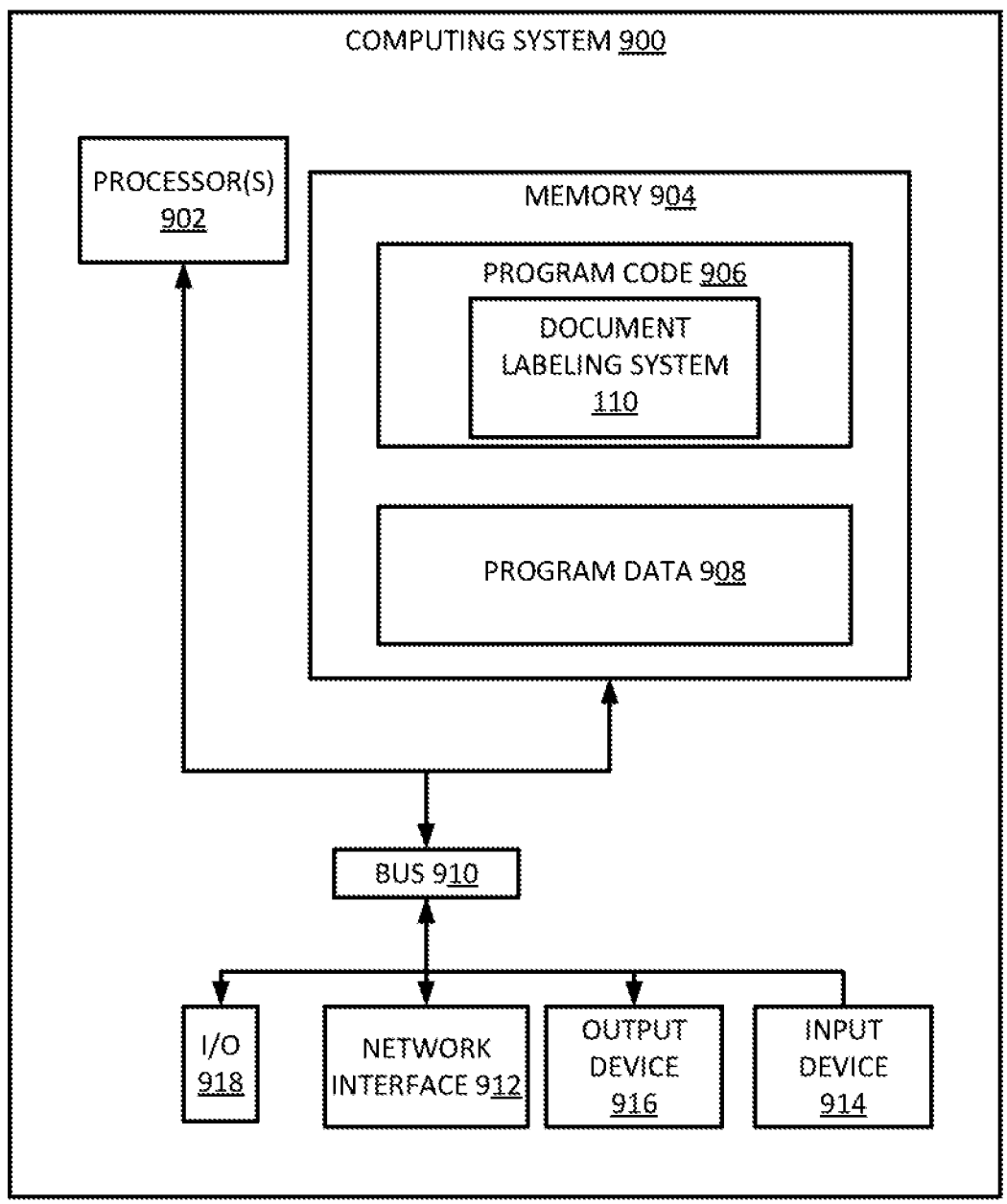
FIG. 9 depicts an example of a computing system for implementing certain embodiments of the present disclosure.

Any suitable computing system or group of computing systems can be used for performing the operations described herein. For example, FIG. 9 depicts an example of a computing system 900. The computing system 900 implements document labeling system 110. In an embodiment, a computing system 900 having devices similar to those depicted in FIG. 9 (e.g., a processor, a memory, etc.) combines the one or more operations and data stores that may be operated as separate subsystems.

The depicted example of the computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing program code 906, program data 908, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 904 can be volatile memory, non-volatile memory, or a combination thereof.

The computing system 900 executes program code 906 that configures the processor 902 to perform one or more of the operations described herein. Examples of the program code 906 include, in various embodiments, document labeling system 110, or any suitable systems or subsystems that perform one or more operations described herein (e.g., identifying concept labels relevant to a set of documents). The program code 906 may be resident in the memory device 904 or any suitable computer-readable medium and may be executed by the processor 902 or any other suitable processor.

The processor 902 is an integrated circuit device that can execute the program code 906. The program code 906 can be for executing an operating system, an application system or subsystem (e.g., text fragment labeling system 1104), or both. When executed by the processor 902, the instructions cause the processor 902 to perform operations of the program code 906. When being executed by the processor 902, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 904 store the program data 908 that includes one or more datasets and models described herein. Examples of these datasets include documents, concept labels, reference hierarchies etc. In some embodiments, one or more of data sets, models, and functions are stored in the same memory device (e.g., one of the memory devices 904). In additional or alternative embodiments, one or more of the programs, data sets, models, and functions described herein are stored in different memory devices 904 accessible via a data network. One or more buses 910 are also included in the computing system 900. The buses 910 communicatively couple one or more components of a respective one of the computing system 900.

In some embodiments, the computing system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computing system 900 is able to communicate with one or more other computing devices via a data network using the network interface device 912.

The computing system 900 may also include a number of external or internal devices, an input device 914, a presentation device 916, or other input or output devices. For example, the computing system 900 is shown with one or more input/output ("I/O") interfaces 918. An I/O interface 918 can receive input from input devices or provide output to output devices. An input device 914 can include any device or group of devices suitable for receiving visual, auditory, or other suitable input that controls or affects the operations of the processor 902. Non-limiting examples of the input device 914 include a touchscreen, a mouse, a keyboard, a microphone, a separate mobile computing device, etc. A presentation device 916 can include any device or group of devices suitable for providing visual, auditory, or other suitable sensory output. Non-limiting examples of the presentation device 916 include a touchscreen, a monitor, a speaker, a separate mobile computing device, etc.

Although FIG. 9 depicts the input device 914 and the presentation device 916 as being local to the computing device that executes document labeling system 110, other implementations are possible. For instance, in some embodiments, one or more of the input device 914 and the presentation device 916 can include a remote client-computing device that communicates with document labeling system 110 via the network interface device 912 using one or more data networks described herein.

Figure 10:
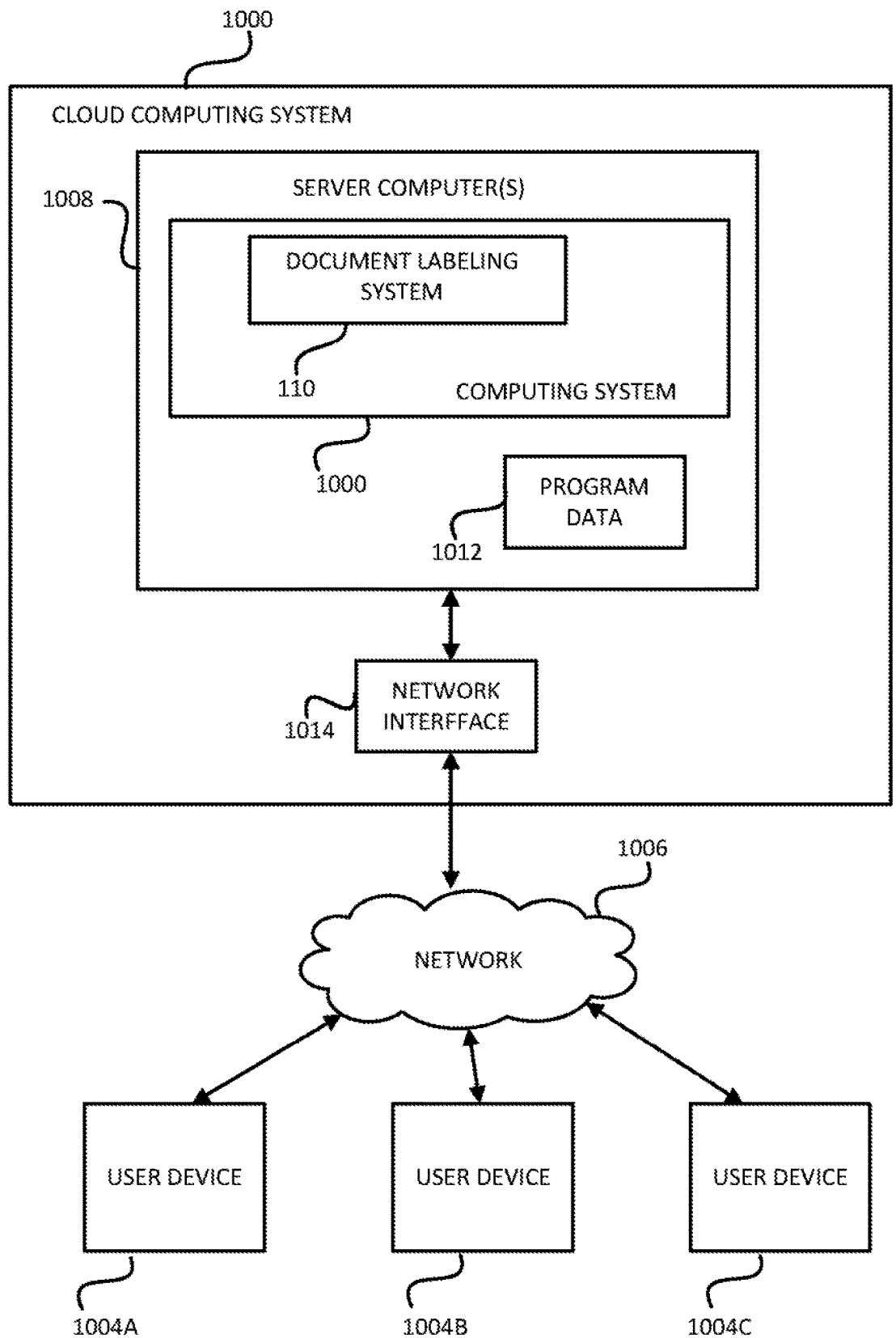
FIG. 10 depicts an example of a cloud computing system offering a document labeling service, in accordance with certain embodiments.

In some embodiments, the functionality provided by document labeling system 110 may be offered as cloud services by a cloud service provider. For example, FIG. 10 depicts an example of a cloud computing system 1000 offering a document labeling service that can be used by a number of user subscribers using user devices 1004a, 1004b, and 1004c across a data network 1006. In the example, the document labeling service may be offered under a Software as a Service (SaaS) model. One or more users may subscribe to the document labeling service, and the cloud computing system 1000 performs the processing to provide the document labeling service to subscribers. The cloud computing system 1000 may include one or more remote server computers 1008.

The remote server computers 1008 include any suitable non-transitory computer-readable medium for storing program code (e.g., text fragment labeling system 1104) and program data 1012, or both, which is used by the cloud computing system 1000 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1008 can include volatile memory, non-volatile memory, or a combination thereof.

One or more of the servers 1008 execute the program code that configures one or more processors of the server computers 1008 to perform one or more of the operations that provide document labeling services, including the ability to identify concept labels and relevance scores for a set of documents provided by one or more subscribers. As depicted in the embodiment in FIG. 10, the one or more servers provide the services to identify concept labels for a set of documents to implement document labeling system 110. Any other suitable systems or subsystems that perform one or more operations described herein (e.g., one or more development systems for configuring an interactive user interface) can also be implemented by the cloud computing system 1000.

In certain embodiments, the cloud computing system 1000 may implement the services by executing program code and/or using program data 1012, which may be resident in a memory device of the server computers 1008 or any suitable computer-readable medium and may be executed by the processors of the server computers 1008 or any other suitable processor.

In some embodiments, the program data 1012 includes one or more datasets described herein. Examples of these datasets include concept labels, relevance scores, reference hierarchies and so on. In some embodiments, one or more of the data are stored in the same memory device. In additional or alternative embodiments, one or more of the programs, data sets, and functions described herein are stored in different memory devices accessible via the data network 1006.

The cloud computing system 1000 also includes a network interface device 1014 that enables communications to and from cloud computing system 1000. In certain embodiments, the network interface device 1014 includes any device or group of devices suitable for establishing a wired or wireless data connection to the data networks 1006. Non-limiting examples of the network interface device 1014 include an Ethernet network adapter, a modem, and/or the like. Document labeling system 110 is able to communicate with the user devices 1004a, 1004b, and 1004c via the data network 1006 using the network interface device 1014.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
extracting, by a computer system, a plurality of semantic units from a plurality of documents;
for each semantic unit in the plurality of semantic units, determining, by the computer system, from a reference set of concept labels, one or more concept labels applicable to the semantic unit;
based on the concept labels determined for the plurality of semantic units, determining, by the computer system, an initial set of concept labels for the plurality of documents, wherein determining the initial set of concept labels comprises:
for each semantic unit in the plurality of semantic units, computing an entropy value for the semantic unit based on the one or more concept labels determined to be applicable to the semantic unit, wherein the entropy value for the semantic unit indicates a degree of specificity of the one or more concept labels to the semantic unit;
ordering the plurality of semantic units based on the computed entropy values; and
using the ordered plurality of semantic units to determine the initial set of concept labels for the plurality of documents;
obtaining, by the computer system, a reference hierarchy associated with the reference set of concept labels, the reference hierarchy identifying hierarchical relationships between two or more concept labels in the reference set of concept labels;
determining, by the computer system, a final set of concept labels for the plurality of documents using the reference hierarchy and the initial set of concept labels; and
outputting, by the computer system, information identifying the final set of concept labels for the plurality of documents.

2. The method of claim 1, wherein the reference set of concept labels comprise titles of a plurality of reference documents, and wherein the plurality of reference documents comprise Wikipedia articles.

3. The method of claim 1, wherein the plurality of semantic units comprise a plurality of paragraphs in the plurality of documents.

4. The method of claim 1, wherein determining, from the reference set of concept labels, for each semantic unit in the plurality of semantic units, the one or more concept labels applicable to the semantic unit comprises:
for each semantic unit in the plurality of semantic units:
for each concept label in the reference set of concept labels, computing, by the computer system, a relevance score for the concept label for the semantic unit, the relevance score for the concept label indicative of a degree of relevance of the concept label to contents of the semantic unit; and
based on the relevance scores computed for the concept labels in the reference set of concept labels for the semantic unit, selecting, by the computer system, the one or more concept labels applicable to the semantic unit from the reference set of concept labels.

5. The method of claim 1, wherein:
a semantic unit in the plurality of semantic units with a higher computed entropy value is placed lower in the ordered plurality of semantic units than a semantic unit in the plurality of semantic units having a lower computed entropy value.

6. The method of claim 1, wherein determining the initial set of concept labels for the plurality of documents further comprises:
(a) selecting an unprocessed semantic unit in the ordered plurality of semantic units with the lowest entropy value;
(b) adding to the initial set of concept labels, any concept label associated with the semantic unit that is not already in the initial set of concept labels; and
(c) marking the selected semantic unit as processed.

7. The method of claim 6 further comprising repeating (a), (b), and (c) until all the semantic units in the ordered plurality of semantic units have been processed or until a first threshold criterion is satisfied, wherein the first threshold criterion is satisfied when a preconfigured threshold number of concept labels are included in the initial set of concept labels.

8. The method of claim 7 further comprising:
determining that the first threshold criterion is satisfied; and
adding additional one or more concept labels to the initial set of concept labels to ensure that each semantic unit in the plurality of semantic units is associated with at least one concept label in the initial set of concept labels.

9. The method of claim 8, wherein adding the additional one or more concept labels to the initial set of concept labels comprises:
for at least one unprocessed semantic unit in the ordered plurality of semantic units:
identifying that a first concept label associated with the at least one unprocessed semantic unit is not included in the initial set of concept labels; and
adding the first concept label to the initial set of concept labels.

10. The method of claim 1, wherein determining the final set of concept labels comprises:
identifying, based upon the reference hierarchy, hierarchical relationships between concept labels in the initial set of concept labels;
generating a Directed Acyclic Graph (DAG) of nodes for representing the hierarchical relationships, each node in the DAG of nodes representing a concept label in the initial set of concept labels and, wherein connections between the nodes in the DAG of nodes represent the hierarchical relationships;
identifying, based upon the reference hierarchy, a set of ancestor concept labels for the concept labels in the initial set of concept labels, wherein, for at least a first concept label in the initial set of concept labels, the set of ancestor concept labels comprises multiple concept labels that are ancestors of the first concept label in the reference hierarchy and the multiple concept labels are not in the initial set of concept labels; and
updating the DAG of nodes to add nodes corresponding to the set of ancestor concept labels to the DAG of nodes, wherein the updating comprises adding connections to the DAG of nodes to represent hierarchical relationships between the nodes representing the set of ancestor concept labels and the nodes representing the concept labels in the initial set of concept labels.

11. The method of claim 10, wherein determining the final set of concept labels further comprises:
assigning a weight to each node in the DAG of nodes based on relevance scores associated with the concept labels represented by the DAG of nodes;
computing a usefulness score for each node in the DAG of nodes based on the weight of the node, wherein the usefulness score for each node in the DAG of nodes is computed based on a weighted relevance score computed for the node and a weighted relevance score computed for one or more descendant nodes of the node in the DAG of nodes;
selecting a node from the DAG of nodes with the highest usefulness score; and
adding a concept label represented by the node selected from the DAG of nodes to the final set of concept labels.

12. The method of claim 11 further comprising:
(a) removing the selected node from the DAG of nodes to generate an updated DAG of nodes;
(b) re-computing a weight for each node remaining in the updated DAG of nodes;
(c) re-computing a usefulness score for each node in the updated DAG of nodes;
(d) selecting a node from the updated DAG of nodes with the highest usefulness score; and
(e) adding a concept label represented by the node selected from the updated DAG of nodes to the final set of concept labels.

13. The method of claim 12 further comprising:
repeating (a), (b), (c), (d), and (e) until a number of concept labels included in the final set of concept labels equals or is higher than a pre-configured threshold number of concept labels.

14. The method of claim 1, wherein the final set of concept labels for the plurality of documents comprises a concept label that is included in the reference set of concept labels and not included in the initial set of concept labels.

15. The method of claim 1, wherein outputting the information associated with the final set of concept labels for the plurality of documents comprises:
for at least one concept label in the final set of concept labels, outputting a usefulness score associated with the at least one concept label, wherein the usefulness score is indicative of an overall relevance of the concept label in the final set of concept labels for representing contents of the plurality of documents.

16. The method of claim 1, further comprising:
receiving information identifying selection of a particular concept label from the final set of concept labels; and
responsive to the receiving, outputting information identifying all documents from the plurality of documents that include at least one semantic unit for which the particular concept label is identified as being applicable; or
responsive to the receiving outputting information identifying all semantic units from one or more semantic units for which the particular concept label is identified as being applicable.

17. The method of claim 1, further comprising:
receiving information identifying selection of a particular document from the plurality of documents; and
responsive to the receiving outputting information identifying all concept labels in the final set of concept labels as being applicable to the particular document.

18. A system comprising:
a memory storing a set of documents to be analyzed; and
one or more processors configured to perform processing comprising:
extracting a plurality of semantic units from a plurality of documents;
for each semantic unit in plurality of semantic units, determining, from a reference set of concept labels, one or more concept labels applicable to the semantic unit based on relevance scores computed for the reference set of concept labels;
based on the concept labels determined for the plurality of semantic units, determining an initial set of concept labels for the set of documents, wherein determining the initial set of concept labels comprises:
for each semantic unit in the plurality of semantic units, computing an entropy value for the semantic unit based on the one or more concept labels determined to be applicable to the semantic unit, wherein the entropy value for the semantic unit indicates a degree of specificity of the one or more concept labels to the semantic unit;
ordering the plurality of semantic units based on the computed entropy values; and
using the ordered plurality of semantic units to determine the initial set of concept labels for the plurality of documents;
obtaining a reference hierarchy associated with the reference set of concept labels, the reference hierarchy identifying hierarchical relationships between two or more concept labels in the reference set of concept labels;
determining a final set of concept labels for the plurality of documents using the reference hierarchy, the initial set of concept labels, and the relevance scores; and
outputting information identifying the final set of concept labels for the plurality of documents.

19. A non-transitory computer-readable medium storing program code for performing operations comprising:
extracting plurality of semantic units from a plurality of documents;
for each semantic unit in plurality of semantic units, determining, from a reference set of concept labels, one or more concept labels applicable to the semantic unit;
based on the concept labels determined for the plurality of semantic units, determining an initial set of concept labels for the plurality of documents, wherein determining the initial set of concept labels comprises:
for each semantic unit in the plurality of semantic units, computing an entropy value for the semantic unit based on the one or more concept labels determined to be applicable to the semantic unit, wherein the entropy value for the semantic unit indicates a degree of specificity of the one or more concept labels to the semantic unit;
ordering the plurality of semantic units based on the computed entropy values; and
using the ordered plurality of semantic units to determine the initial set of concept labels for the plurality of documents;
obtaining a reference hierarchy associated with the reference set of concept labels, the reference hierarchy identifying hierarchical relationships between two or more concept labels in the reference set of concept labels;

determining a final set of concept labels for the plurality of documents using the reference hierarchy and the initial set of concept labels; and outputting information identifying the final set of concept labels for the plurality of documents.

\* \* \* \* \*